United States Patent
Vengroff

(10) Patent No.: US 10,874,244 B2
(45) Date of Patent: Dec. 29, 2020

(54) ADAPTIVE THERMAL CONTROL FOR A COOKING SYSTEM

(71) Applicant: Meyer Intellectual Properties Limited, Kowloon (HK)

(72) Inventor: Darren Erik Vengroff, Seattle, WA (US)

(73) Assignee: Meyer Intellectual Properties Limited

(*) Notice: Subject to any disclaimer, the term of this patent is extended or adjusted under 35 U.S.C. 154(b) by 255 days.

(21) Appl. No.: 15/699,807

(22) Filed: Sep. 8, 2017

(65) Prior Publication Data

US 2018/0070756 A1 Mar. 15, 2018

Related U.S. Application Data

(60) Provisional application No. 62/384,955, filed on Sep. 8, 2016.

(51) Int. Cl.
| | | |
|---|---|---|
| *G05D 23/00* | (2006.01) | |
| *A47J 27/00* | (2006.01) | |
| *A47J 36/32* | (2006.01) | |
| *A23L 5/10* | (2016.01) | |

(52) U.S. Cl.
CPC .............. *A47J 27/002* (2013.01); *A23L 5/10* (2016.08); *A47J 36/321* (2018.08); *A23V 2002/00* (2013.01)

(58) Field of Classification Search
CPC ......................... G05D 7/0629; F23N 2023/08
USPC .................................................. 700/274, 266
See application file for complete search history.

(56) References Cited

U.S. PATENT DOCUMENTS

| | | | |
|---|---|---|---|
| 4,214,300 A | 7/1980 | Barlow et al. | |
| 4,381,438 A | 4/1983 | Goessler et al. | |
| 5,441,344 A | 8/1995 | Cook, III | |
| 8,538,597 B2 | 9/2013 | Beckley et al. | |
| 8,692,162 B2 | 4/2014 | Elston et al. | |
| 8,800,542 B1 | 8/2014 | Kennington | |
| 2004/0016348 A1 | 1/2004 | Sharpe | |
| 2007/0080158 A1 | 4/2007 | Takimoto | |
| 2012/0132642 A1 | 5/2012 | Broders et al. | |
| 2013/0112683 A1 | 5/2013 | Hegedis et al. | |
| 2015/0208845 A1 | 7/2015 | Robbins et al. | |
| 2015/0208858 A1* | 7/2015 | Robbins ................ A47J 45/068 426/231 |
| 2016/0174748 A1 | 6/2016 | Baldwin et al. | |
| 2017/0238749 A1 | 8/2017 | Vengroff et al. | |

FOREIGN PATENT DOCUMENTS

| | | | |
|---|---|---|---|
| JP | S62-70904 A | 4/1987 | |
| JP | 2008-34228 A | 2/2008 | |
| WO | 2008154763 A1 | 12/2008 | |
| WO | 2011113334 A1 | 9/2011 | |
| WO | 2012092863 A1 | 7/2012 | |
| WO | 2013/134239 A1 | 9/2013 | |

OTHER PUBLICATIONS

International Search Report dated Jan. 11, 2018 in connection with PCT/US2017/050842.
Written Opinion of the International Searching Authority dated Jan. 10, 2018 in connection with PCT/US2017/050842.
Examination Report No. 1 dated Aug. 27, 2019 in connection with corresponding Australian Patent Application No. 2017322514.
Examination Report dated Feb. 4, 2020, issued in connection with corresponding Canadian Patent Application No. 3,036,221.
Notification of Reasons for Refusal dated Feb. 4, 2020, issued in connection with corresponding Japanese Patent Application No. 2019-512976.

\* cited by examiner

*Primary Examiner* — Natalia Levkovich
(74) *Attorney, Agent, or Firm* — Akerman LLP

(57) ABSTRACT

According to one example, a system includes a heat source operable to provide an amount of energy to be used to cook a food item, and further includes one or more processors. The processors are operable to receive an indication of a requested cooking temperature, and to receive a plurality of indications of measured temperature associated with the food item at different times. The processors are further operable to determine an integral term based on differences between the requested cooking temperature and the measured temperatures, to determine a heat loss term based on the integral term, and to determine an energy adjustment based on the heat loss term. The heat source is further operable to modify the amount of energy provided by the heat source in accordance with the determined energy adjustment.

16 Claims, 6 Drawing Sheets

ADAPTIVE THERMAL CONTROL FOR A COOKING SYSTEM

CROSS-REFERENCE TO RELATED APPLICATIONS

This application claims priority to U.S. Provisional Patent Application No. 62/384,955 filed Sep. 8, 2016, the entirety of which is incorporated herein by reference.

TECHNICAL FIELD

This disclosure relates generally to the field of cooking appliances and more specifically to an adaptive thermal control for a cooking system.

BACKGROUND

Traditionally, a user has cooked food by manually turning on a heat source using a knob, placing the food over the heat source, and estimating (or measuring or timing) when the food is done cooking. Such traditional cooking techniques, however, may be deficient.

SUMMARY

In a first example, a system comprises a heat source operable to provide an amount of energy to be used to cook a food item; and one or more processors communicatively coupled to the heat source, and operable, when executed, to receive an indication of a current temperature associated with the food item; receive an indication of a requested cooking temperature; determine whether a difference between the requested cooking temperature and the current temperature is a positive value or a negative value; in response to the determination that the difference is a positive value, determine an energy adjustment based on a first set of one or more gain constants; and in response to the determination that the difference is a negative value, determine an energy adjustment based on a second set of one or more gain constants; wherein the heat source is further operable to modify the amount of energy provided by the heat source in accordance with the determined energy adjustment.

Another example includes any such system wherein the first set of one or more gain constants comprises a first set of each of a first proportional gain constant, a first integral gain constant, and a first derivative gain constant; and the second set of one or more gain constants comprises a second set of each of a second proportional gain constant, a second integral gain constant, and a second derivative gain constant.

Another example includes any such system wherein the processors are further operable, when executed, to in response to the determination that the difference is the positive value, determine the energy adjustment based on a first proportional term that is determined based on the first proportional gain constant; a first integral term that is determined based on the first integral gain constant, and a first derivative term that is determined based on the first derivative gain constant.

Another example includes any such system wherein the processors are further operable, when executed, to in response to the determination that the difference is the negative value, determine the energy adjustment based on a second proportional term that is determined based on the second proportional gain constant; a second integral term that is determined based on the second integral gain constant, and a second derivative term that is determined based on the second derivative gain constant.

Another example includes any such system wherein the first proportional gain constant is different from the second proportional gain constant; the first integral gain constant is different from the second integral gain constant; and the first derivative gain constant is different from the second derivative gain constant.

Another example includes any such system wherein the system further comprises a heat source system that comprises both the heat source and the processors.

Another example includes any such system wherein the system further comprises a remote device that comprises the processors, wherein the remote device is devoid of the heat source, and wherein the remote device is positioned remotely from the heat source.

In a second example, a method comprises providing, by a heat source of a heat source system, an amount of energy to be used to cook a food item in accordance with a cooking recipe; receiving, by one or more processors communicatively coupled to the heat source, an indication of a current temperature associated with the food item; receiving, by the processors, an indication of a requested cooking temperature; determining, by the processors, whether a difference between the requested cooking temperature and the current temperature is a positive value or a negative value; in response to the determination that the difference is a positive value, determining, by the processors, an energy adjustment based on a first set of one or more gain constants; in response to the determination that the difference is a negative value, determining, by the processors, an energy adjustment based on a second set of one or more gain constants; modifying, by the heat source, the amount of energy provided in accordance with the determined energy adjustment.

In a third example, a non-transitory computer readable medium comprises logic configured, when executed by one or more processors, to receive an indication of a current temperature associated with a food item; receive an indication of a requested cooking temperature; determine whether a difference between the requested cooking temperature and the current temperature is a positive value or a negative value; in response to the determination that the difference is a positive value, determine an energy adjustment based on a first set of one or more gain constants; in response to the determination that the difference is a negative value, determine an energy adjustment based on a second set of one or more gain constants; and transmit the determined energy adjustment, wherein the determined energy adjustment is configured to cause a heat source to modify an amount of energy being provided by the heat source to cook the food item.

In a fourth example, a system comprises a heat source operable to provide an amount of energy to be used to cook a food item; and one or more processors communicatively coupled to the heat source, and operable, when executed, to: receive an indication of a requested cooking temperature; receive a plurality of indications of measured temperature associated with the food item at different times; determine an integral term based on differences between the requested cooking temperature and the measured temperatures; determine a heat loss term based on the integral term; and determine an energy adjustment based on the heat loss term; wherein the heat source is further operable to modify the amount of energy provided by the heat source in accordance with the determined energy adjustment.

Another example includes any such system wherein the processors are further operable, when executed, to determine the energy adjustment based on the heat loss term and the integral term.

Another example includes any such system wherein the heat loss term is calculated as a fraction of the integral term.

Another example includes any such system wherein the heat loss term is calculated as a fraction of the integral term by multiplying the integral term by a number between 0.5 to 0.9.

Another example includes any such system wherein the heat loss term is calculated from an integral term calculated over a plurality of the measured temperatures that extend from the last two consecutive instances in which the measured temperature was less than the requested cooking temperature.

Another example includes any such system wherein the heat loss term is calculated from a plurality of integral terms, each of the plurality of integral terms being calculated over a plurality of the measured temperatures that extend from the last two consecutive instances in which the measured temperature was less than the requested cooking temperature.

Another example includes any such system wherein the heat loss term is calculated from an average of a plurality of integral terms, each of the plurality of integral terms being calculated over a plurality of the measured temperatures that extend from the last two consecutive instances in which the measured temperature was less than the requested cooking temperature.

Another example includes any such system wherein the heat loss term is further calculated as a fraction of each of the plurality of integral terms by multiplying each of the plurality of integral terms by a number between 0.5 to 0.9.

Another example includes any such system wherein the heat loss term is calculated from a weighted average of a plurality of integral terms, each of the plurality of integral terms being calculated over a plurality of the measured temperatures that extend from the last two consecutive instances in which the measured temperature was less than the requested cooking temperature, wherein the most recently determined of the plurality of integral terms is weighted more than a previously determined integral term.

Another example includes any such system wherein the heat loss term is further calculated as a fraction of each of the plurality of integral terms by multiplying each of the plurality of integral terms by a number between 0.5 to 0.9.

Another example includes any such system wherein the processors are further operable, when executed, to: determine a proportional term based on the differences between the requested cooking temperature and the measured temperatures; determine a derivative term based on the differences between the requested cooking temperature and the measured temperatures; and determine the energy adjustment based on the heat loss term, the integral term, the proportional term, and the derivative term.

In a fifth example, a non-transitory computer readable medium comprises logic configured, when executed by one or more processors, to: receive an indication of a requested cooking temperature; receive a plurality of indications of measured temperature associated with the food item at different times; determine an integral term based on differences between the requested cooking temperature and the measured temperatures; determine a heat loss term based on the integral term; determine an energy adjustment based on the heat loss term; and transmit the determined energy adjustment, wherein the determined energy adjustment is configured to cause a heat source to modify an amount of energy being provided by the heat source to cook the food item.

In a sixth example, a method comprises providing, by a heat source of a heat source system, an amount of energy to be used to cook a food item in accordance with a cooking recipe; receiving, by one or more processors communicatively coupled to the heat source, an indication of measured temperature associated with the food item; receiving, by the processors, an indication of a requested cooking temperature; determining, by the processors, whether the requested cooking temperature is less than the measured temperature; in response to the determination that the requested cooking temperature is less than measured temperature, determining, by the processors, a proportional term based on a difference between the requested cooking temperature and the measured temperature; energizing the heat source in response to the determined proportional term; receiving, by the processors, a plurality of indications of additional measured temperature associated with the food item at different times; determining, by the processors, an integral term based on differences between the requested cooking temperature and the additional measured temperatures; determining, by the processors, a heat loss term based on the integral term; determining, by the processors, an energy adjustment based on the proportional term, the integral term, and the heat loss term; and energizing the heat source in accordance with the determined energy adjustment.

Another example includes any such method wherein the heat loss term is calculated as a fraction of the integral term.

Another example includes any such method wherein the heat loss term is calculated as a fraction of the integral term by multiplying the integral term by a number between 0.5 to 0.9.

Another example includes any such method wherein the heat loss term is calculated from an integral term calculated over a plurality of the additional measured temperatures that extend from the last two consecutive instances in which the additional measured temperature was less than the requested cooking temperature.

Another example includes any such method further comprising: receiving, by the processors, an indication of another measured temperature associated with the food item; determining, by the processors, whether the requested cooking temperature is less than the another measured temperature; in response to the determination that the requested cooking temperature is less than the another measured temperature, determining, by the processors: a second proportional term based on a difference between the requested cooking temperature and the another measured temperature; and a first derivative term based on the past change in the measured temperatures; energizing the heat source in response to the determined second proportional term and the first derivative term.

BRIEF DESCRIPTION OF THE FIGURES

For a more complete understanding of the present disclosure and its features and advantages, reference is now made to the following description, taken in conjunction with the accompanying drawings, in which.

DETAILED DESCRIPTION

Embodiments of the present disclosure are best understood by referring to FIGS. 1A-5 of the drawings, like numerals being used for like and corresponding parts of the various drawings.

Typically, automated cooking systems have utilized conventional proportional-integral-derivative (PID) controllers to control cooking temperatures. Such conventional PID controllers, however, may be deficient in cooking processes performed in a fluctuating environment. Such fluctuating environments may include environments where cold food is added to the cooking process, where the room temperature changes, where room drafts may be present, where other food items may be cooking nearby, where the food items are not fully enclosed in a controlled environment during cooking (e.g., in open pots and pans), where cooking temperatures are constantly changing (e.g., recipes that call for different cooking temperatures), where recipes are being changed, and/or where cooking is performed outside of non-unitary systems (e.g., in which the heating source is not coupled directly to a fixed known vessel or other known food support surface).

Also, some cooks may traditionally utilize sous vide cooking, where bagged food is added to a water bath having a precise temperature. However, sous vide has extensive pre-cooking preparation and post cooking finishing steps. Further, some consumers may find the sous vide cooked food item to be deficient when compared to pan seared cooking techniques. In some examples, cooking system 10 of FIGS. 1A-5 may address one or more of the above deficiencies.

Figure 1A:
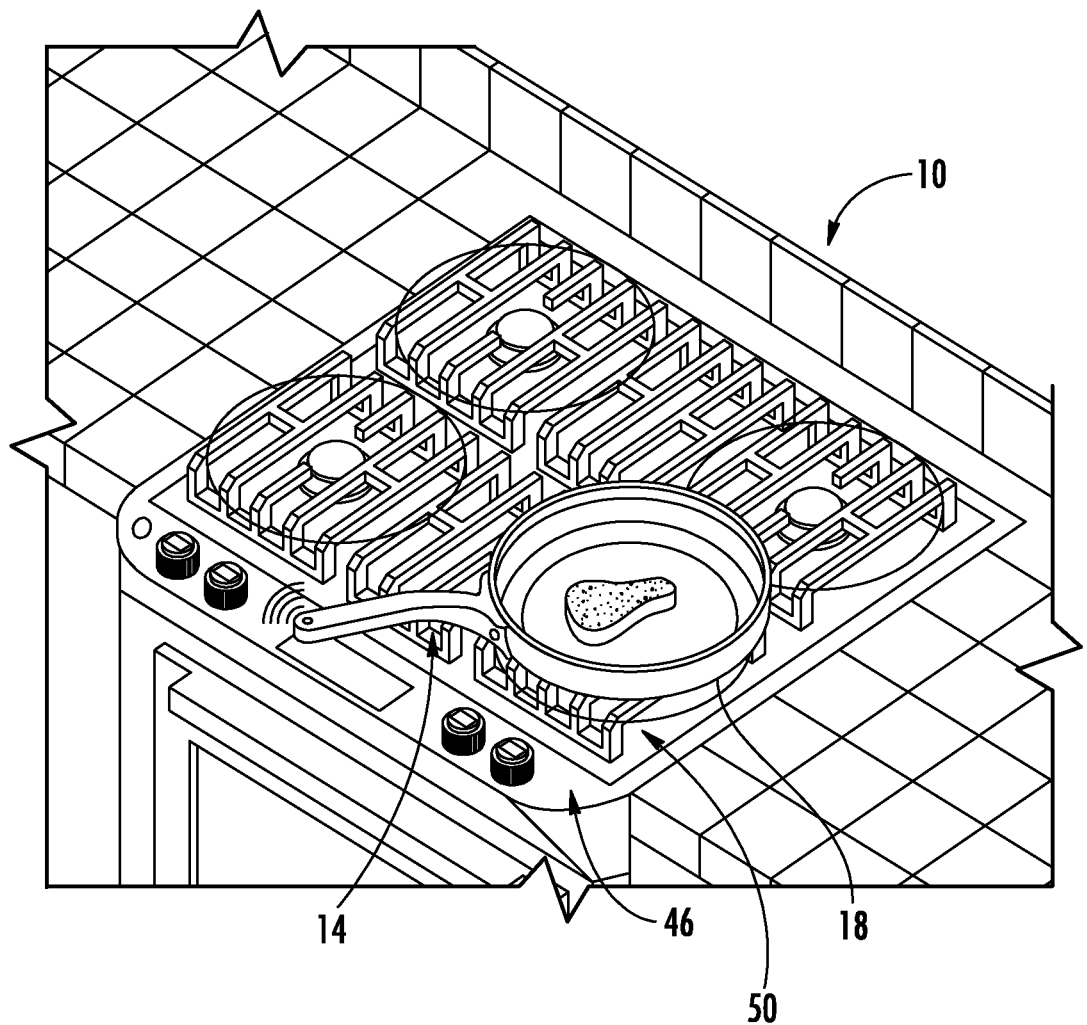
FIGS. 1A-1B illustrate an example cooking system that may assist a user in cooking a food item.
Figure 1B:
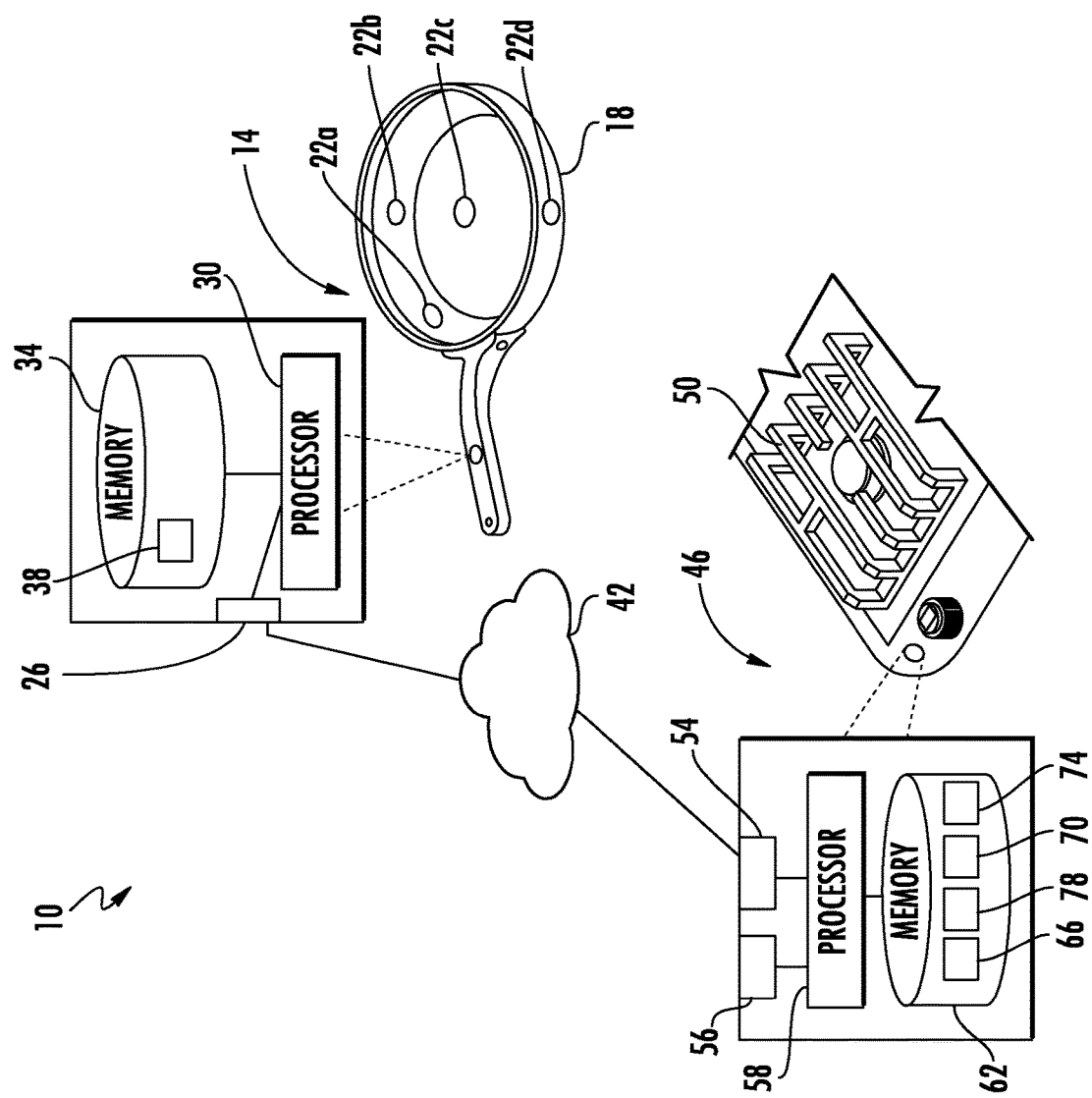

FIGS. 1A-1B illustrate an example cooking system 10 that may assist in controlling a temperature at which a food item (such as a steak) is cooked. As is illustrated, the cooking system 10 includes a cooking device system 14 that includes a cooking device 18 (e.g., a cooking pan), and one or more measurement sensors 22a-22d that may measure a current temperature associated with the food item. The cooking system 10 further includes a heat source system 46 (e.g., a gas burner system, an electric burner system, or an induction burner system) that includes a heat source 50 (e.g., the front left gas burner of a stove top). To cook a food item, the heat source system 46 may change the amount of energy (e.g., heat) provided to the cooking device 18 based on the current measured temperature associated with the food item and further based on a desired cooking temperature (e.g., the temperature indicated in the cooking recipe), in some examples.

In one example of operation of FIGS. 1A-1B, a user may desire to cook a food item, such as a steak. Cooking of the food item may involve heating a cooking device 18 to a requested cooking temperature (such as 375° F.). To do so, a user may activate a heat source 50 to begin providing energy to the cooking device 18. To assist in proper heating of the cooking device 18, one or more measurement sensors 22a-22d may measure a current temperature associated with the food item, and that current temperature may be transmitted to the heat source system 46. The heat source system 46 may determine the difference between the requested cooking temperature (such as 375° F.) and the current temperature. If the difference is a positive value, the heat source system 46 may calculate an energy adjustment using a first set of one or more gain constants ($\alpha$, $\beta$ and $\gamma$, discussed below). Alternatively, if the difference is a negative value, the heat source system 46 may calculate the energy adjustment using a second set of one or more gain constants (with the second set being different from the first set). The heat source system 46 may additionally (or alternatively) determine a heat loss term associated with the cooking, and use the heat loss term to determine the energy adjustment.

In some examples, this may allow the cooking system 10 to more quickly reach a requested cooking temperature, more quickly recover from environmental fluctuations, reduce risk of overshooting (and/or undershooting) a desired cooking temperature, and/or provide greater stability of the cooking process at the desired cooking temperature. Furthermore, this may, in some examples, provide a better cooking process, as preventing temperature fluctuations may be particularly important in cooking delicate proteins that denature at a precise temperature and rapidly change (such as a steak turning from rare to medium well, or calamari turning rubbery).

The cooking system 10 may provide precise automated temperature control, even under various adverse conditions similar to those encountered in professional cooking processes. For example, the cooking system 10 may provide precise automated temperature control when the cooking process utilizes skillets or pots on a burner, when the cooking process involves a wide variety of food types, when the cooking process involves adding ingredients at various stages, and/or when the cooking process involves a wide variety (or range) of cooking techniques, methods, utensil types, and food types.

The cooking system 10 may further modulate the energy (e.g., power) provided by the heat source 50 to rapidly bring the cooking environment to the desired cooking temperature with minimum overshoot in temperature. It may also minimize undershooting of the desired cooking temperature. Additionally, it may reduce the magnitude of error of any overshoot and undershoot states (e.g., fewer and lower magnitude positive and negative deviations), as well as increase the ability to hold the food item at a particular temperature for a desired period of time.

The cooking system 10 may further provide for adaptive control that accounts for loss of heat to the environment when a cooking device 18 is being provided energy from the heat source 50. Also, the cooking system 10 may perform continuous adjustment for heat losses to the environment. Furthermore, it may account for the dynamic variance due to the addition of ingredients and the transformation of the food items.

As is illustrated, the cooking system 10 may include cooking device system 14. Cooking device system 14 represents any suitable components that may be used for cooking a food item. The cooking device system 14 may also communicate with the heat source system 46 (discussed below) to assist in controlling a temperature at which a food item is cooked.

The cooking device system 14 may include a cooking device 18, measurement sensors 22 (e.g., measurement sensors 22a-22d), a network interface 26, a processor 30, and a memory unit 34. The cooking device 18 may be any device that may be used in cooking a food item. For example, the cooking device 18 may be a food support platform that may support, hold, and/or enclose the food item while it is being cooked. Examples of such a food support platform include a pan, a vessel, a tray, a grill platen, a grate, an oven, a pressure cooker, a rice cooker, a slow cooker, a microwave oven, a toaster oven, an oven, a teapot, any other device that may support, hold, and/or enclose a food item while it is being cooked, or any combination of the preceding. As is illustrated, the cooking device 18 is a cooking pan.

As another example, the cooking device 18 may be a cooking utensil, such as a spoon, tongs, a spatula, a measurement probe (such as a probe that measures temperature), any other utensil that may be used while cooking a food item, or any combination of the preceding. In such examples, the cooking device 18 (e.g., a cooking utensil) may be a separate device that may be introduced into a food support platform (such as into a cooking pot). For example, the cooking device 18 may be attached to the handle of the cooking pot, may be inserted into the lid of the cooking pot, and/or may be mounted to the cooking pot in any other way. This may allow the cooking device 18 (and any measurement sensor(s)) to touch the bottom of the cooking pot adjacent the food item, be inserted into fluid that at least partially surrounds a portion of the food item, be inserted into the vapor space above (or around) the food item, and/or be inserted into a bore disposed in a sidewall or bottom of the cooking pot. Additionally, in such examples, the cooking device 18 (e.g., a cooking utensil) may be used in any food support platform, and may also be used with multiple food support platforms (i.e., it is portable). For example, the cooking device 18 may be used with a first food support platform (such as a cooking pot), and then it may be removed and inserted into a second food support platform (such as a cooking pan).

A measurement sensor 22 (e.g., measurement sensors 22a-22d) represents any sensor that may measure or sense (or otherwise provide) a measurement associated with a food item. For example, a measurement sensor 22 may be a temperature sensor that measures a temperature of the food item, a temperature adjacent the food item (such as a temperature of a portion of the cooking device 18 or a temperature of the environment inside or adjacent the cooking device 18), a temperature that the food item is being cooked at, any other temperature associated with cooking the food item, or any combination of the preceding. In such an example, the measurement sensor 22 may be a thermocouple, a thermistor, an infrared sensor, a surface acoustic wave (SAW) device, any other device that may measure temperature, or any combination of the preceding. As another example, the measurement sensor 22 may measure any other attribute that may assist in the cooking process, such as volume, weight, moisture, acidity, alkalinity, color, pressure, liquid level, the denaturing of one or more proteins, any other attributes of the food item and/or the cooking device 18, or any combination of the preceding. As is illustrated, the measurement sensors 22 are temperature sensors that measure a temperature of various portions of the cooking device 18.

The measurement sensor(s) 22 may be coupled to (or otherwise positioned at) any location in, on, or adjacent the cooking device 18 so as to allow the measurement sensor(s) 22 to measure information associated with the food item, and to further allow the measurement sensor(s) 22 to transmit such information to the processor 30. As an example, the measurement sensor(s) 22 may be coupled to a base of cooking device 18. As another example, the measurement sensor(s) 22 may be coupled to a lid (in the interior and/or on the exterior) of the cooking device 18. In such an example, the measurement sensor 22 may be a lid-mounted sensor that is supported by a lid handle. Further, the lid handle may include the network interface 26 (such as a transceiver). As another example, the measurement sensor(s) 22 may be coupled to a sidewall (in the interior and/or on the exterior) of the cooking device 18. In other examples, the measurement sensor(s) 22 may be coupled at any other location in, on, or adjacent cooking device 18, or any combination of the preceding. In further examples, the measurement sensor(s) 22 may be positionable into a liquid that surrounds a food item (e.g., sous vide).

The measurement sensor(s) 22 may be coupled to (or otherwise positioned at) such a location in any manner. As an example, the measurement sensor(s) 22 may be bonded to the location (using an adhesive, for example), connected to the location using a rivet or a clip, positioned in-between two or more materials at the location (such as two or more layers of the material of the cooking device 18), formed integral with the cooking device 18 at the location (such as formed integral with all or a portion of the cooking device 18), coupled to the location in any other manner, or any combination of the preceding. The measurement sensor(s) 22 may be coupled in a manner that allows the measurement sensor(s) 22 to be detached from the location. This may allow the measurement sensor(s) 22 to be removed and coupled to a different location in, on, or adjacent the cooking device 18. This may further allow the measurement sensor(s) 22 to be removed and coupled to a different cooking device 18.

As is discussed above, the cooking device system 14 may further include network interface 26, a processor 30, and a memory unit 34. The network interface 26, processor 30, and memory unit 34 may be positioned at any location on, in, or adjacent the cooking device 18 so as to allow the network interface 26 and processor 30 to communicate with the measurement sensor(s) 22, and further communicate with the heat source system 46. In such an example, the processor 30 may be communicatively coupled (and potentially physically or electrically coupled) to the measurement sensor(s) 22 and/or the heat source system 46. According to the illustrated example, the network interface 26, processor 30, and memory unit 34 are positioned in (or on) the handle of the cooking device 18. As another example, one or more of the network interface 26, processor 30, and memory unit 34 may be positioned in (or on) a handle of the lid of the cooking device 18. Positioning in or on the handle(s) may, in some examples, protect these components from excessive heat. As a further example, one or more of the network interface 26, processor 30, and/or memory unit 34 may be integrated with the measurement sensor(s) 22. In such examples, the measurement sensor(s) 22 may be able to communicate directly (via a wireless or wired link) with the heat source system 46.

Network interface 26 represents any suitable device operable to receive information from network 42, transmit information through network 42, receive information from measurement sensors 22, transmit information to measurement sensors 22, perform processing of information, communicate to other devices, or any combination of the preceding. For example, network interface 26 receives measurements from measurement sensors 22. As another example, network interface 26 transmits measurement information 74 (such as a current temperature) to heat source system 46. Network interface 26 represents any port or connection, real or virtual, (including any suitable hardware and/or software, including protocol conversion and data processing capabilities, to communicate through a local area network (LAN), a metropolitan area network (MAN), wide area network (WAN), or other communication system) that allows cooking device system 14 to exchange information with network 42, heat source system 46, or other components of system 10. In some examples, the network interface 26 may be a transmitter, a receiver, and/or a transceiver. In such examples, the network interface 26 may transmit and/or receive information via a wired connection or a wireless connection.

Processor 30 communicatively couples to network interface 26 and memory unit 34, and controls the operation and administration of cooking device system 14 by processing information received from network interface 26 and memory unit 34. Processor 30 includes any hardware and/or software that operates to control and process information. For example, processor 30 executes a cooking device system management application 38 to control the operation of cooking device system 14, such as to communicate with the heat source system 46 to assist in controlling a temperature at which a food item is cooked. Processor 30 may be a programmable logic device, a microcontroller, a microprocessor, any suitable processing device, or any combination of the preceding.

Memory unit 34 stores, either permanently or temporarily, data, operational software, or other information for processor 30. Memory unit 34 includes any one or a combination of volatile or non-volatile local or remote devices suitable for storing information. For example, memory unit 34 may include random-access memory (RAM), read-only memory (ROM), magnetic storage devices, optical storage devices, any other suitable information storage device, or any combination of the preceding. While illustrated as including particular information modules, memory unit 34 may include any suitable information for use in the operation of cooking device system 14.

As illustrated, memory unit 34 may include cooking device system management application 38. Cooking device system management application 38 represents any suitable set of instructions, logic, or code embodied in a computer-readable storage medium and operable to facilitate the operation of cooking device system 14.

Network 42 represents any suitable network operable to facilitate communication between the components of system 10, such as cooking device system 14 and heat source system 46. Network 42 may include any interconnecting system capable of transmitting audio, video, signals, data, messages, or any combination of the preceding. Network 42 may include all or a portion of a public switched telephone network (PSTN), a public or private data network, a LAN, a MAN, a WAN, a wireless personal area network (WPAN), a local, regional, or global communication or computer network, such as the Internet, a wireline or wireless network, an enterprise intranet, or any other suitable communication link, including combinations thereof, operable to facilitate communication between the components. Preferable examples of network 42 may include a WPAN, a cellular communication network, an infrared communication network, any other wireless network operable to facilitate communication between the components, or any combination of the preceding.

Heat source system 46 represents any suitable components that can provide an amount of energy to cook a food item, and that can further communicate with the cooking device system 14 to control a temperature at which a food item is cooked.

As is illustrated, the heat source system 46 may include a heat source 50, a network interface 54, a user interface system 56, a processor 58, and a memory unit 62. The heat source 50 may be any device that may provide an amount of energy to cook a food item. For example, the heat source 50 may be a burner (such as an induction burner, gas burner, infrared burner, and/or heating coil), a resistive heating element, a heat lamp (such as Halogen lamp), an oven, a microwave, a stove top, a range, a grill, a griddle, any other device that may provide an amount of energy to cook a food item, or any combination of the preceding. As is illustrated, the heat source 50 is a gas burner that provides heat energy in the form of a gas flame. The heat source system 46 may include any number of heat sources 50.

The heat source 50 may further be connected to a power source that provides power (or energy) to the heat source 50, thereby allowing the heat source 50 to provide an amount of energy to cook a food item. The power source may be any type of power source, such as an electrical power source (e.g., a battery or a connection to an electrical outlet), a gas power source (e.g., a gas canister or a connection to a gas line), any other source of power (or energy), or any combination of the preceding.

As is discussed above, the heat source system 46 may further include network interface 54, user interface system 56, processor 58, and memory unit 62. The network interface 54, user interface system 56, processor 58, and memory unit 62 may be positioned at any location on, in, and/or adjacent the heat source system 46 so as to allow the network interface 54 and processor 58 to communicate with the heat source(s) 50 of the heat source system 46 and/or communicate with the cooking device system 14. In such an example, the processor 58 may be communicatively coupled (and potentially physically or electrically coupled) to the heat source(s) 50 and/or the wireless device 14 and/or the cooking device system 14.

Network interface 54 represents any suitable device operable to receive information from network 42, transmit information through network 42, receive information from heat source 50, transmit information to heat source 50, perform processing of information, communicate to other devices, or any combination of the preceding. For example, network interface 54 may receive measurement information 74 (e.g., temperature information) associated with the cooking of a food item from the cooking device system 14. Network interface 54 represents any port or connection, real or virtual, (including any suitable hardware and/or software, including protocol conversion and data processing capabilities, to communicate through a LAN, MAN, WAN, or other communication system) that allows heat source system 46 to exchange information with network 42, cooking device system 14, and/or other components of system 10.

User interface system 56 represents any suitable components that allow a user to provide input to the heat source system 46 and/or that allow the heat source system 46 to provide output (such as a visual output) to the user of heat source system 46. For example, the user interface system 56 may include a touch sensor that allows the user to input a desired amount of energy that is to be used by the heat source system 46 to cook a food item. As another example, the user interface system 56 may include light sources that may provide a visual representation of the amount of energy that is currently being used by the heat source system 46 to cook a food item.

Processor 58 communicatively couples to network interface 54, user interface system 56, and memory unit 62, and controls the operation and administration of heat source system 46 by processing information received from network interface 54, user interface system 56, and memory unit 62. Processor 58 includes any hardware and/or software that operates to control and process information. For example, processor 58 executes a heat source system management application 66 to control the operation of heat source system 46, such as to provide an amount of energy to cook a food item, and to communicate with the cooking device system 14 to assist the user in cooking. Processor 58 may be a digital processor, a programmable logic controller (PLC), a microcontroller, a microprocessor, any suitable processing device, or any combination of the preceding.

Memory unit 62 stores, either permanently or temporarily, data, operational software, or other information for processor 58. Memory unit 62 includes any one or a combination of volatile or non-volatile local or remote devices suitable for storing information. For example, memory unit 62 may include RAM, ROM, magnetic storage devices, optical storage devices, any other suitable information storage device, or any combination of the preceding. While illustrated as including particular information modules, memory unit 62 may include any suitable information for use in the operation of heat source system 46.

As illustrated, memory unit 62 may include heat source system management application 66, cooking instructions 70, and measurement information 74. Heat source system management application 66 represents any suitable set of instructions, logic, or code embodied in a computer-readable storage medium and operable to facilitate the operation of heat source system 46.

Cooking instructions 70 represent any set of instruction(s) that may be utilized by the heat source system 46 to assist the user in cooking. For example, the cooking instructions 70 may be a temperature that a food item is to be cooked at (such as 375° Fahrenheit), a period of time that a food item is to be cooked at a particular temperature (such as 45 minutes at 375° Fahrenheit), a food identifier that is to be added to food item (such as onions), any other information associated with cooking or a cooking recipe, or any combination of the preceding. The cooking instructions 70 may be received by the heat source system 46 from a wireless device (such as a tablet or a Smartphone). Examples of this are described in detail in U.S. Patent Application Publication No. 2017/0238749, filed Feb. 17, 2017, and entitled "User Interface for a Cooking System" (the entirety of which is incorporated herein by reference). Furthermore, instead of receiving one or more of the cooking instructions 70, such cooking instructions 70 may be dynamically determined. For example, cooking instructions 70 (such as the temperature that a food item is to be cooked at, and the period of time that a food item is to be cooked) can be dynamically determined based on a measurement size, weight, and/or or shape of food items. Furthermore, they can be dynamically determined based on a preference for doneness level (rare/medium/well or soft/firm) and the like. This dynamic determination may be done prior to, or during the cooking process.

Measurement information 74 represents any set of measurements associated with a food item in (or adjacent to) the cooking device system 14. For example, the measurement information 74 may be a current temperature associated with the food item (e.g., the current temperature the food item is being cooked at), a weight measurement associated with the food item, an acidity measurement associated with the food item, a measure of the degree to which chemical reactions associated with cooking (such as the Maillard reaction or denaturation of proteins) have occurred during cooking, any other measurement associated with the food item (or the cooking device system 14), or any combination of the preceding. The measurement information 74 may be received by the heat source system 46 from the cooking device system 14.

Energy information 78 represents any set of information that may be utilized by the heat source system 46 to determine one or more changes to be made to an amount of energy being output by a heat source 50. For example, energy information 78 may include one or more algorithms and/or equations that may be used to calculate an amount of energy that is to be output by a heat source 50. Further details regarding examples of energy information 78 are discussed below. In some examples, the heat source system 46 may utilize a combination of cooking instructions 70, measurement information 74, and energy information 78 to determine one or more changes to be made to an amount of energy being output by a heat source 50.

Modifications, additions, and/or substitutions may be made to the cooking system 10, the components of the cooking system 10, and/or the functions of the cooking system 10 without departing from the scope of the specification. For example, the cooking system 10 may further include one or more remote devices or intermediary devices (e.g., a wireless device, such as a Smartphone) that may perform one or more of the functions of the cooking system 10, such as to determine one or more changes to be made to an amount of energy being output by the heat source 50. In such an example, the remote device may determine the change in the amount of energy, and then may transmit an indication of that change to the heat source system 46 and/or the heat source 50. In other examples, the cooking device system 46 may determine the change in the amount of energy, and then may transmit an indication of that change to the heat source system 46 and/or the heat source 50.

Figure 2:
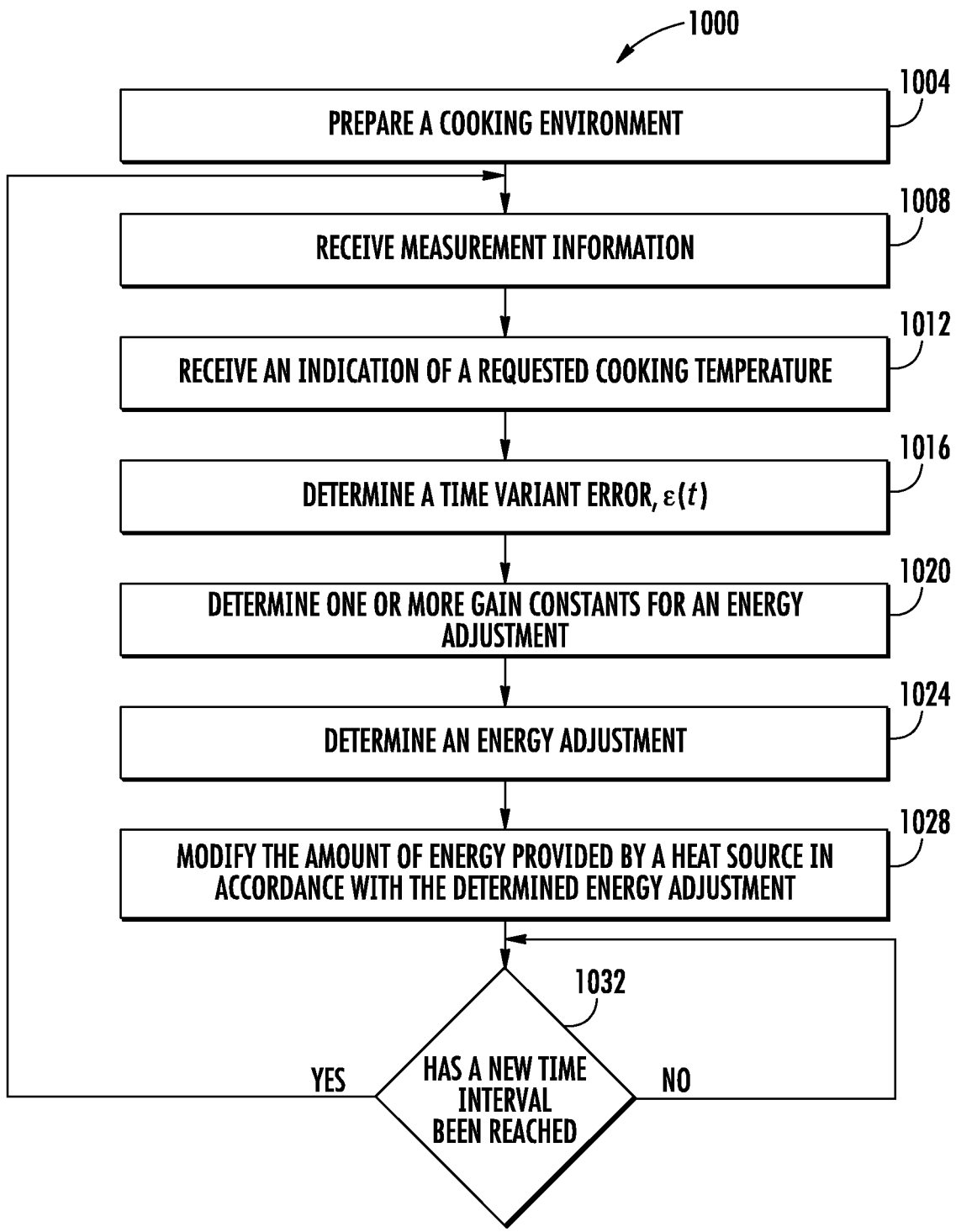
FIG. 2 illustrates an example of the operation of the cooking system of FIGS. 1A-1B.

FIG. 2 illustrates an example of the operation of cooking system 10. According to the example illustrated in FIG. 2, a user may desire to cook a food item, such as a steak. To do so, the user may prepare the cooking environment at step 1004 of method 1000. The user may prepare the cooking environment in any manner. For example, preparing the cooking environment may include selecting a recipe to use to cook the food item, preparing the food item for cooking (e.g., cutting the food item, seasoning the food item, marinating the food item, etc.), selecting a heat source system 46 and heat source 50 to use to cook the food item, selecting a cooking device system 14 to use to cook the food item, positioning the cooking device system 14 on the heat source 50, activating the heat source 50 (such as by selecting a cooking temperature of, for example, 375° Fahrenheit on the user interface 56 of the heat source system 46), adding the food item to the cooking device system 14, adding one or more additional ingredients to the food item or the cooking device system 14, any other steps for preparing the cooking environment, or any combination of the preceding. Examples of preparing the cooking environment are discussed further in U.S. Patent Application Publication No. 2017/0238749.

Following step 1004, the method 1000 may move to step 1008, where measurement information 74 may be received by the heat source system 14 from the cooking device system 14. The method 1000 may move to step 1008 at any point during the cooking process of the food item. For example, the process of cooking a food item may include various steps that result in the food item being prepared for consumption. In such an example, the method 1000 may move to step 1008 at any point before, during, or after one or more of these cooking steps. As an example, the method 1000 may move to step 1008 at the beginning of the cooking process, such as when the heat source 50 is activated. As another example, the method 1000 may move to step 1008 when a new food item is added to the cooking device system 18 (possibly resulting in a drop in temperature). As a further example, the method 1000 may move to step 1008 when the cooking temperature is adjusted, such as when a user manually adjusts the cooking temperature up or down (such as at the beginning of a new step in the cooking recipe), or when a device (such as a wireless device and electronic cookbook of U.S. Patent Application Publication No. 2017/0238749) adjusts the cooking temperature up or down (such as at the beginning of a new step in the cooking recipe).

As is discussed above, at step 1008, measurement information 74 may be received by the heat source system 14 from the cooking device system 14. The measurement information 74 may include any information that may be measured using the measurement sensors 22. For example, the measurement information 74 may include an indication of the current temperature associated with the food item (e.g., the current temperature that the food item is being cooked at). This indication may be data (or other information) that may allow the heat source system 46 to determine the current temperature associated with the food item. For example, the indication may be the current temperature itself (e.g., 325° F.) or may be a signal or pointer (or any other type of data) that may be used by the heat source system 46 to determine that the current temperature is 325° F.

The measurement information 74 may be received based on measurements made by one or more measurement sensors 22. For example, the measurement information 74 may be received as a result of one or more measurement sensors 22 measuring the current temperature, or as a result of any other measurement made by the one or more measurement sensors 22. The measurement information 74 may be received based on measurements made by any number of the measurement sensors 22. For example, the measurement information 74 may be based on measurements made a single measurement sensor 22, or by two or more measurement sensors 22. Furthermore, the measurement information 74 may be an average of the measurements made by each the measurement sensors 22, or it may include each measurement made by each measurement sensor 22.

The measurement information 74 may be provided to the heat source system 46 from the cooking device system 14 in any manner. For example, the measurement information 74 may be transmitted to the heat source system 46 over network 42. In such an example, any network communication protocol may be used to transmit the measurement information 74. For example, the cooking device system 14 may transmit the measurement information 74 using a WPAN communication link (e.g., Bluetooth, Bluetooth low power, Bluetooth 5, ANT+, Zigbee (IEEE 802.15.4), other IEEE 802.15 protocols, IEEE 802.11 A, B or G without limitation, Wi-FI (IEEE 802.11n), or Z-Wave (ITU-T G.9959), and the like), a cellular communication link, an infrared communication link, any other wireless communication link, a wired communication link (e.g., when the cooking device system 14 is connected to the heat source system 46 via one or more wires, when the cooking device system 14 and heat source system 46 are portions of the same rice cooker or other unitary cooking device, when the measurement sensors 22 are plugged into the heat source system 46, etc.), any other communication link, or any combination of the preceding.

The measurement information 74 may be received automatically from the cooking device system 14 (e.g., in accordance with a schedule, such as every 2 seconds). In some examples, the measurement information 74 may be received in response to a prompt (or other message) sent from the heat source system 46 to the cooking device system 14.

At step 1012, an indication of a requested cooking temperature is received. The requested cooking temperature may refer to a temperature at which the food item is to be cooked at. For example, the requested cooking temperature may refer to a temperature (e.g., 375° F.) at which the food item is supposed to be cooked at in accordance with a step of a cooking recipe (e.g., a recipe for cooking steak). In such an example, the requested cooking temperature may change at different steps/stages in the cooking recipe. In some examples, the requested cooking temperature may be included in cooking instructions 70.

The indication of the requested cooking temperature may be data (or other information) that may allow the heat source system 46 to determine the requested cooking temperature. For example, the indication may be the requested temperature itself (e.g., 325° F.) or may be a signal or pointer (or any other type of data) that may be used by the heat source system 46 to determine that the requested temperature is 325° F.

The indication of the requested cooking temperature may be received in any manner. For example, the indication of the cooking temperature may be received when a user manually sets the heat source system 46 (or heat source 50) at a particular temperature (e.g., 325° F.) using the user interface 56. As another example, the indication of the requested cooking temperature may be received when it is retrieved from a memory unit (such as memory unit 62 of the heat source system 46). In such an example, the heat source system 46 may have received the indication of the requested cooking temperature in cooking instructions 70, and may have stored the indication of the requested cooking temperature in its memory 62 unit. The heat source system 46 may have received the indication of the requested cooking temperature in cooking instructions 70 at any time prior to the heat source system 46 retrieving the requested cooking temperature from the memory unit 62. Examples of the heat source system 46 receiving the indication of the requested cooking temperature are further discussed in U.S. Patent Application Publication No. 2017/0238749, which explains how cooking instructions 70 may be received from an electronic cookbook being executed by a wireless device (such as an iPad, tablet, a smart phone). In such examples, the cooking instructions 70 may include the indication of the requested cooking temperature.

At step 1016, a time variant error, $\varepsilon(t)$, during the cooking process is determined. The time variant error may refer to the difference between the set cooking temperature and the actual temperature. For example, in the example of method 100, the time variant error may refer to the difference between the requested cooking temperature (received in step 1012) and the current temperature that the food item is being cooked at (received in step 1008). When the current temperature that the food item is being cooked at (e.g., 325° F.) is less than the requested cooking temperature (e.g., 375° F.), the time variant error is a negative value (e.g., negative 50° F.). Alternatively, when the current temperature that the food item is being cooked at (e.g., 425° F.) is greater than the requested cooking temperature (e.g., 375° F.), the time variant error is a positive value (e.g., positive 50° F.). Typically, it is desirable to avoid such positive time variant errors, while also rapidly reaching the requested cooking temperature and keeping the current temperature at the requested cooking temperature (for a particular amount of time at a particular step in the cooking process).

At step 1020, one or more gain constants for an energy adjustment are determined. Gain constants (α, β, and γ) may refer to parameters that allow a PID controller to be tuned, so as to optimize the PID controller. During a PID controller tuning process, the value of each of the gain constants may be individually changed (e.g., increased) until each optimum gain constant is determined, thereby optimizing the PID controller.

A traditional PID controller includes three parameters: a proportional term, an integral term, and a derivative term. This is seen below in the following equation for energy level at a particular time. This equation is one example of energy information 78.

$$\mathrm{Pwr}(t)=P(t)\alpha+I(t)\beta+D(t)\gamma$$

where $P(t)\alpha$ is the proportional term
where $I(t)\beta$ is the integral term
where $D(t)\gamma$ is the derivative term The proportional term accounts for the present value of the time variant error, $\varepsilon(t)$, discussed above. If the time variant error is large and positive, the energy adjustment (e.g., the energy provided by the heat source 50) will also be large and positive. As seen above, the equation for the proportional term is $P(t)\alpha$. Thus, the proportional term is based on the "P" variable (which is equal to the time variant error) at a particular time, and further based on the proportional gain constant (α). This proportional gain constant may allow the proportional term to be tuned to a particular application of the PID controller.

The integral term accounts for past values of the time variant error, $\varepsilon(t)$. For example, if the current amount of provided energy is not sufficiently strong, the integral of the time variant error will accumulate over time, and the PID controller will respond by applying a stronger action. As seen above, the equation for the integral term is $I(t)\beta$. Thus, the integral term is based on the "I" variable (an equation for which is discussed below) at a particular time, and further based on the integral gain constant (β). This integral gain constant may allow the integral term to be tuned to a particular application of the PID controller.

The derivative term accounts for possible future trends of the time variant error, $\varepsilon(t)$, based on its current rate of change. For example, when the energy adjustment succeeds in bringing the time variant error closer to zero, it also may put the process on a path to a large negative error in the near future. Based on this, the derivative term may turn negative and reduce the strength of the energy adjustment to prevent this overshoot. As seen above, the equation for the derivative term is $D(t)\gamma$. Thus, the derivative term is based on the "D" variable (an equation for which is discussed below) at a particular time, and further based on the derivative gain constant (γ). This derivative gain constant may allow the derivative term to be tuned to a particular application of the PID controller.

As is discussed above, at step 1020, one or more gain constants for an energy adjustment are determined. A gain constant may be determined in any manner. As a first example, the gain constant may be a single fixed value that is used for every application of the cooking system 10. In such an example, the gain constant may be determined by retrieving the gain constant from storage (e.g., from storage in the cooking instructions 70), or by receiving the gain constant from an outside source (such as an electronic cookbook).

As another example, the gain constant may be a value that changes based on what kind of heat source system 46 is being used for cooking a food item, what kind of cooking device system 14 is being used for cooking a food item, and/or what kind of food item(s) are being cooked. As an example of this, the proportional gain constant (α) may be a different value when the food item is being cooked with a cast iron pan (e.g., α=1.2) than when the food item is being cooked with a stainless steel pan (e.g., α=1.4). In such an example, the gain constant may be determined by tuning the PID controller using manual or automatic (self-tuning) methods during one or more initial heating cycles. An example of a self-tuning PID controller is discussed in U.S. Pat. No. 4,214,300 issued to Barlow et al. on Jul. 22, 1980, which is incorporated herein by reference.

The gain constant may further be determined by retrieving the gain constant from storage (e.g., where different gain constants are stored for different heat source system 46/cooking device systems 14/food item(s)). In such an example, the heat source system 46 may receive a signal that specifies what cooking device 18 is being used and/or what food item is being cooked. Based on this, the heat source system 46 may retrieve the predetermined gain constants based on the cooking device 18 and/or food item. The signal specifying the cooking device 18 may be received in any manner. For example, the cooking device 18 may include a radio-frequency identification (RFID) chip that identifies the cooking device 18 to the heat source system 46, or the cooking device 18 may communicate with the heat source system 46 to identify the cooking device 18 (as is discussed in U.S. Patent Application Publication No. 2017/0238749).

As another example, the gain constant may further be determined by retrieving the gain constant from other storage locations (e.g., retrieving the gain constant from a manufacturer's website or a chef's blog). As a further example, the gain constant may further be determined by retrieving the gain constant from social websites (e.g., retrieving the gain constant from a website that aggregates other users' experiences with a particular gain constant for a particular application) or other crowd sourcing sites (e.g., blogs, twitter, etc.).

In the examples above, the gain constant may be the same value, regardless of the determined time variant error $\varepsilon(t)$. That is, the gain constant may have the same value regardless of whether the time variant error is a positive value or a negative value. Alternatively, the gain constant may be a value that differs based on the current determined time variant error, $\varepsilon(t)$. In such an example, the gain constant may be a first value (e.g., 1.3) if the time variant error is a positive value, and may alternatively be a second value (e.g., 1.1) if the time variant error is a negative value. This may allow a first gain constant to be used when there is an undershoot in energy, and may also allow a second gain constant to be used when there is an overshoot in energy. All of the gain constants may each have a first value if the time variant error is positive, and a second value if the time variant error is a negative. This may result in 6 different values that could be selected from, with two possibilities for each gain constant. In other examples, only some of the gain constants (i.e., one or more of the proportional gain constant, the integral gain constant, and the derivative gain constant) may each have a first value if the time variant error is positive, and a second value if the time variant error is negative.

The first value for a gain constant or the second value for a gain constant (or both) may be a single fixed value that is used for every application of the cooking system 10. In such examples, the gain constant may be determined by retrieving the possible gain constant values (e.g., from storage or from an outside source) and then determining which gain constant value to use based on the positive or negative time variant error (or vice versa).

In other examples, the first value for a gain constant or the second value for a gain constant (or both) may be a value that changes based on what heat source system 46 is being used for cooking a food item, what cooking device system 14 is being used for cooking a food item, and/or what food item(s) are being cooked (as is discussed above). In such an example, the possible gain constant values may be determined by tuning the PID controller using manual or automatic (self-tuning) methods during one or more initial heating cycles. In this example, the tuning may be performed for the first value, the second value, or both. The possible gain constant may further be determined by retrieving the possible gain constant from storage (e.g., where different possible gain constant values are stored for different heat source system 46/cooking device systems 14/food item(s)), retrieving the possible gain constant values from other storage locations, and/or retrieving the possible gain constant values from social websites or crowd sourcing sites.

As an example of this, the heat source system 46 may store predetermined gain constants (such as 6 predetermined gain constants: positive and negative gain constants for each of $\alpha$, $\beta$ and $\gamma$) for each cooking device 18. In such an example, the heat source system 46 may receive a signal that specifies what cooking device 18 is being used (and/or what food item is being cooked). Based on this, the heat source system 46 may retrieve the predetermined gain constants (such as the 6 predetermined gain constants stored for that cooking device 18). Then, the determination may further include determining which gain constant values to use based on the positive or negative time variant error. For example, the heat source system 46 may determine which 3 predetermined gain constants (1 for each of $\alpha$, $\beta$ and $\gamma$) to use based on the positive or negative time variant error. Alternatively, the heat source system 46 may first determine whether the time variant error is positive or negative, and then may use that result to retrieve the applicable gain constant value using any of the determination methods discussed above.

At step 1024, an energy adjustment is determined. The energy adjustment may refer to a determined control variable value that may be used to modify the amount of energy provided by the heat source 50 to the cooking device system 14. This modification of the amount of energy provided by the heat source 50 may allow the time variant error, $\varepsilon(t)$, to rapidly approach zero for a particular step (or stage) in the cooking process.

The energy adjustment may be determined in any manner. As an example, the energy adjustment may be determined by first determining each of the proportional term, integral term, and derivative term, and then summing these terms in order to determine the energy adjustment. In such an example, the energy adjustment may be determined using the following equation included in the energy information 78:

$$Pwr(t) = P(t)\alpha + I(t)\beta + D(t)\gamma$$

- where $P(t) = \varepsilon(t)$
- where $I(t) = \varepsilon(t_{m+1}) + \Sigma\varepsilon(t_i)$ ○ where $i = 1$ to $m$
- where $D(t) = \dfrac{T(t_{i+1}) - T(t_i)}{t_{i+1} - t_i}$ ○ where $i = 1$ to $n$ The above equation for energy adjustment includes the proportional gain constant ($\alpha$), the integral gain constant ($\beta$), and the derivative gain constant ($\gamma$). As such, the energy adjustment may be determined using the gain constants ($\alpha$, $\beta$, $\gamma$) determined above in step 1020. Furthermore, as is discussed above in step 1020, one or more of the gain constants ($\alpha$, $\beta$, $\gamma$) may be determined based whether the time variant error is a positive value or a negative value (determined in step 1016). If the time variant error is a positive value (i.e., a value greater than zero), a first set of one or more gain constants may be used to determine the energy adjustment: $\alpha_p$, $\beta_p$, and/or $\gamma_p$. In such an example, the equation for energy adjustment may be modified as seen below:

$$Pwr(t)=P(t)\alpha_p+I(t)\beta_p+D(t)\gamma_p$$

On the other hand, if the time variant error is a negative value (i.e., a value less than zero), a second set of one or more gain constants may be used to determine the energy adjustment: $\alpha_n$, $\beta_n$, and/or $\gamma_n$. In such an example, the equation for energy adjustment may be modified as seen below:

$$Pwr(t)=P(t)\alpha_n+I(t)\beta_n+D(t)\gamma_n$$

In some examples, it may be preferable that each of the gain constants ($\alpha$, $\beta$, and $\gamma$) have a first value when the time variant error is positive, and a second value when the time variant error is negative. In such examples, the energy adjustment may be determined using these different values for each of the gain constants. In other examples, less than all of the gain constants (such as only $\alpha$, or only $\beta$, or only $\alpha$ and $\beta$, etc.) may have first value when the time variant error is positive, and a second value when the time variant error is negative. In such examples, the other gain constant(s) may have the same value regardless of whether the time variant error is positive or negative.

Furthermore, in some examples, it may not yet be possible (or desirable) to determine the integral term and the derivative term, as there may not yet be enough information to make such determinations. For example, in some examples, the integral term and the derivative term may not be able to be determined until the time variant error has been determined multiple times for a particular step (e.g., for a particular requested cooking temperature) or a particular portion of a step (e.g., after new ingredients have been added). As an example, when the heat source system 46 is first set at a particular temperature (e.g., 375) for cooking, the integral term and the derivative term may not be able to be determined during the first time through the steps of method 1000. This inability may be the result of not having enough information to determine the integral term and the derivative term. However, after the steps of method 1000 have been performed more than once (e.g., after the time variant error has been determined more than once) for that particular temperature, the integral term and the derivative term may now be determined.

If the integral term and the derivative term are not determinable, the energy adjustment may be determined using only the proportional term. This may be accomplished using the same equations discussed above, but modified to zero out the integral term and the derivative term. Also, the energy adjustment may be determined using only the proportional term, regardless of whether or not the integral term and the derivative term are determinable. In other examples, the energy adjustment may be determined using only the proportional and integral terms, or only the proportional and derivative terms.

As is discussed above, the energy adjustment may be determined in step 1024 by first determining each (or one or more) of the proportional term, integral term, and derivative term, and then summing these terms in order to determine the energy adjustment. In other examples, the energy adjustment may be determined by additionally determining a heat loss term, and then summing the heat loss term with each (or one or more) of the proportional term, integral term, and derivative term in order to determine the energy adjustment.

The heat loss term accounts for heat loss to the environment, such as by radiation, conduction and/or convection. Such heat loss may not be determinable apriori. Furthermore, such heat loss may vary based on the size, shape, and/or type of cooking device system 14, cooking device 18 (e.g., the size, shape, and/or type of cooking pan), heat source system 46, and/or heat source 50. It may further vary based on the size, shape, and type of food item(s) being cooked, the environmental conditions where the food item is being cooked (e.g., a cold room), changes in content or heat capacity during cooking, and/or any other factor that may affect heat loss. The heat loss term may be considered as an offset heat loss factor. It should be appreciated that the heat loss term can have a different value for each step of a recipe. Furthermore, the heat loss term may change during a step of a recipe (e.g., as fluid evaporates, as ingredients are added, as food times are removed, etc.).

The equation for the heat loss term may be $S(t)\beta$, in some examples. Thus, the heat loss term may be based on the "S" variable (an equation for which is discussed below) at a particular time, and further based on the integral gain constant ($\beta$).

Figure 3:
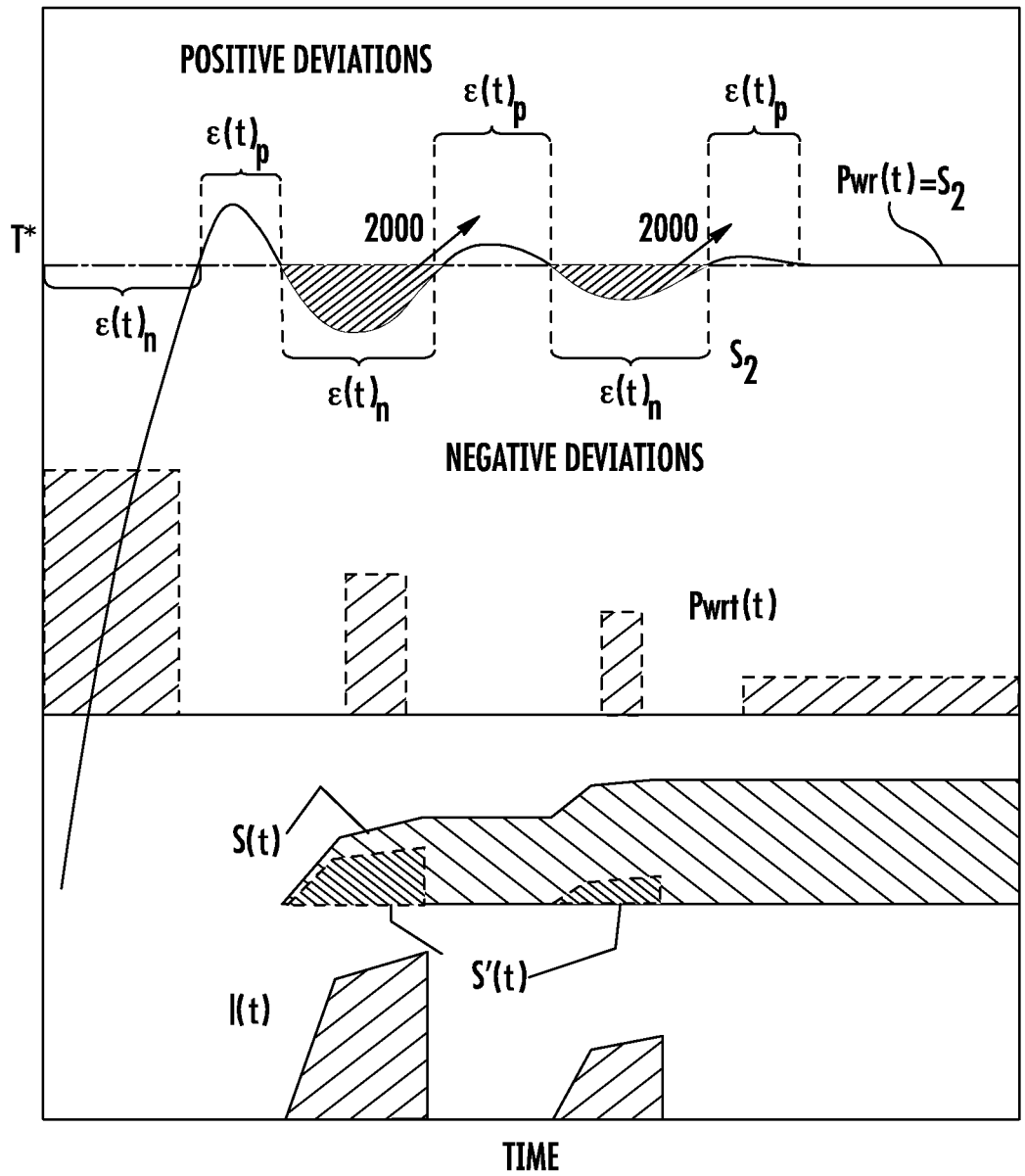
FIG. 3 illustrates an example schematic timing diagram associated the example of operation of FIG. 2.

The heat loss term may be determined based on the integral term. For example, the "S" variable for the heat loss term may be determined based on the "I" variable of the integral term. An example of this can be seen in the following equation for the "S" variable of the heat loss term. This equation may be included in the energy information 78.

$$S(t_i) = S(t_{i-1}) + \rho I(t_n - t_m)$$

where i is the time of the most current temperature measurement where n is the time of the previous temperature measurement where m is a time between the start of the process (t=0) to some value representing a significant deviation in the integral term to distinguish the integral term from the proportional term $\rho$ is a weighting constant less than 1 but greater than zero, typically between about 0.5 to about 0.9, but more preferably about 0.8, in some examples In some examples, the "S" variable of the heat loss term can be determined using different variables for the above referenced equation than those discussed above. For example, an optional S variable (S') can be calculated using the S variable equation illustrated above, but with different values for n and $t_n$–$t_m$. In such an example, n can optionally be the time of the last "zero crossing" (i.e., the change from a negative deviation to a positive deviation, or vice versa). Examples of such zero crossings are illustrated by arrows 2000 in FIG. 3 (which illustrates an example schematic timing diagram associated with the method 1000 of FIG. 2). Furthermore, $t_n$–$t_m$ can optionally be the time interval of a deviation of ε(t) (i.e., the time between the zero crossings, when ε(t) is negative). An example of the difference between a heat loss term determined using the S variable and a heat loss term determined using the S' variable is illustrated in FIG. 3.

As is discussed above, the S variable of the heat loss term may be determined based on the I variable of the integral term. In some examples, the S variable may be determined based on an I variable that is calculated using the following equation included in the energy information 78:

$$I(t) = \varepsilon(t_{m+1}) + \Sigma \varepsilon(t_i)$$

where i=1 to m

In other examples, the S variable may be determined based on an optional I variable (I'). The optional I variable may represent the total integral, or any portion thereof, from time=zero to the most current temperature measurement or the last negative deviation. The optional I variable may be weighted toward the most recent measurement of temperature, as is seen below with the following equation (included in the energy information 78) for the optional I variable:

$$I'(t_i) = (t_i - t_{i-1}) * \varepsilon(t_i) + \rho I'(t_{i-1})$$

where $t_i$ and $t_{i-1}$ are the last two temperature measurement times where $\rho$ is a decay weighting constant less than 1 but greater than zero, typically between about 0.2 to about 0.8, but more preferably about 0.5, in some examples. The most distal error measurement may decrease in contribution to I' in favor of more recent values.

Using the optional I variable (I') to determine the heat loss term may allow the heat loss term to be calculated from an accumulated fraction of the integral term. Additionally, it may further allow the heat loss term to be calculated from a decay weighted cumulative fraction of the integral term.

In some examples, the heat loss term may be determined based on an area of the integral term. Such a determination may be beneficial when the time variant error remains negative for several duty cycles (e.g., 10 duty cycles), or when the time variant error remains negative for more than a predetermined amount of time (e.g. 30 seconds). In such examples, the heat loss term may be calculated based on a fraction of the total area built up in the integral term during that time (e.g., ½ or ¼ of the area). This fraction may be subtracted from the integral term, and then added to the heat loss term (which is initially zero). Essentially, this may move some of the integral term into the heat loss term; however, it may produce the same exact energy adjustment (discussed below) as before. Over several iterations of this type of determination, the heat loss term will grow and the integral will tend toward zero, in some examples. As the heat loss term grows over multiple cycles, a fixed energy offset may be determined so as to maintain the desired temperature.

The heat loss term may only be determined when the integral term is determinable (e.g., when the time variant error has been determined multiple times for a particular step), in some examples. However, in some examples, a default heat loss term may be used as the heat loss term when the integral term is not yet determinable. In such examples, the default heat loss term may be the heat loss term used in the prior step of a cooking process, a heat loss term used in a prior cooking process (such as the last time a similar steak was cooked), a heat loss term included in a cooking recipe, a heat loss term determined when other users performed a similar cooking process (such as an aggregate of heat loss terms calculated when other users cooked a similar steak), a heat loss term supplied by the manufacturer of the cooking device 18 and/or the heat source 50, any other default heat loss term, or any combination of the preceding. This default heat loss term may only be used until the integral term is determinable, thereby allowing another heat loss term to be determined through calculation using the integral term. In other examples, the default heat loss term(s) may continue to be used throughout the cooking process. These default heat loss terms may be used as the actual heat loss terms, or to modify the actual heat loss terms (e.g., to correct for possible errors or deviations).

In some examples, determining the heat loss term may be delayed, even after such a determination becomes possible. For example, it may be preferable to wait to calculate (or tune) an optimum proportional gain constant, an optimum integral gain constant, and an optimum integral gain constant for a particular stage (which may take one or more initial heating cycles), before attempting to determine the heat loss term. In such an example, the heat loss term may not be used to determine energy adjustment, or a default heat loss term may be used to determine energy adjustment.

The heat loss term may be determined in an iterative process. For example, the heat loss term may be reset (e.g., to zero) on each instance of the time variant error, $\varepsilon(t)$, transitioning from a positive value to a negative value (or vice versa).

Following the determination of the heat loss term (as is discussed above), the energy adjustment may be determined using the heat loss term. For example, the energy adjustment may be determined by summing the heat loss term with each (or one or more) of the proportional term, integral term, and derivative term in order to determine the energy adjustment. In such an example, the energy adjustment may be determined using the following equation included in the energy information 78:

$$Pwr(t) = P(t)\alpha + I(t)\beta + D(t)\gamma + S(t)\beta$$

where $P(t)\alpha$ is the proportional term
where $I(t)\beta$ is the integral term
where $D(t)\gamma$ is the derivative term
where $S(t)\beta$ is the heat loss term Alternatively, in some examples where the optional I variable (I') was used to determine the heat loss term, the energy adjustment may be determined using the following equation included in the energy information 78:

$$Pwr(t) = P(t)\alpha + I'(t)\beta + D(t)\gamma + S(t)\beta$$

Figure 4:
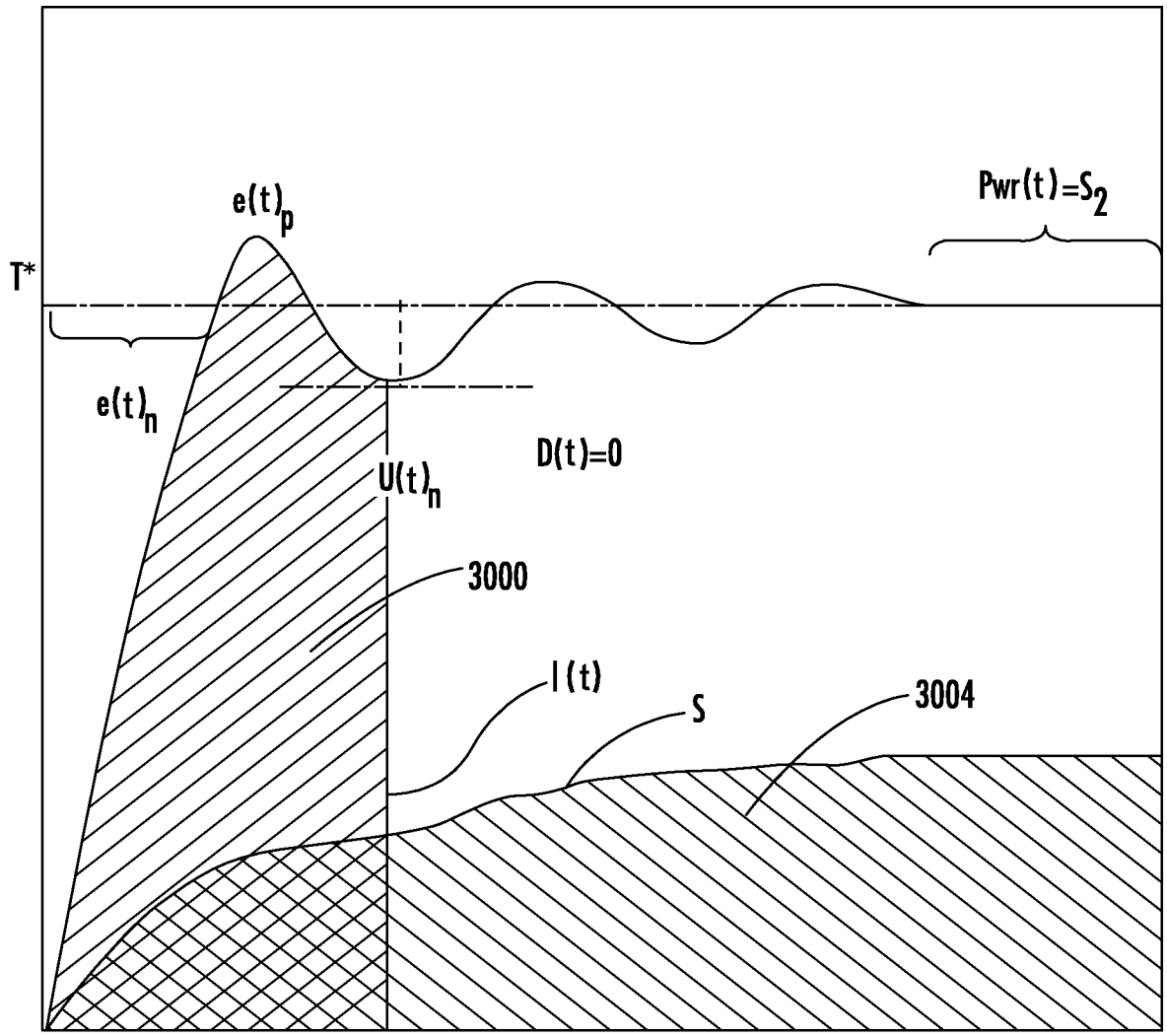
FIG. 4 illustrates another example schematic timing diagram associated the example of operation of FIG. 2.

In some examples, because the heat loss term may be determined based on the integral term, $I(t)$ may cease to increase as $\varepsilon(t)$ becomes zero. In such examples, $I(t)\beta$, $I'(t)\beta$ and/or $S\beta$ may become constant values. An example of the growth of the heat loss term is illustrated in FIG. 4 (shown as S), which illustrates another example schematic timing diagram associated with the method 1000 of FIG. 2. Specifically, the growth of the heat loss term over time is illustrated at the first undershoot minima (in which $D(t)$ is zero) shown at area 3000 as the sum of $I(t)$ (which is illustrated as a first hatched area). Furthermore, the heat loss term (shown at area 3004, which is illustrated as a second opposite hatched area) gradually increases beyond a second minima, and reaches stable value S2 (in which the final applied energy (Pwr) to maintain the temperature of the cooking environment at T* is S2).

Optionally, as illustrated in FIG. 3, when $\varepsilon(t)$ changes from positive to negative, the value of the integral term (for the purpose of calculating the heat loss term) may occur over just this time period. The example timing diagram of FIG. 3 schematically shows the periodic application of energy (Pwr(t)) as the integral term (or optional integral term) is calculated anew on each undershoot cycle. As is seen, $S(t)$ is growing in value during these periods, finally reaching a stable value S2 when the applied energy is S2.

Following the determination of the energy adjustment at step 1024, the method 1000 may move to step 1028, where the energy provided by heat source 50 is modified in accordance with the determined energy adjustment. For example, if the energy adjustment indicates that the energy should be increased, the heat source 50 (based on a signal from the processor 58, for example) may increase the amount of energy provided by the heat source 50 to the cooking device system 14. Alternatively, if the energy adjustment indicates that the energy should be decreased, the heat source 50 may decrease the amount of energy provided by the heat source 50 to the cooking device system 14. Furthermore, if the energy adjustment indicates that the energy should remain the same, the heat source 50 may not change the amount of energy provided by the heat source 50 to the cooking device system 14. In some examples, this may allow the time variant error, $\varepsilon(t)$, to rapidly approach zero for a particular step (or stage) in the cooking process.

In some examples, when the time error variant (calculated above) is negative (e.g., an overshoot in temperature), it may be desirable to both decrease the amount of energy provided by the heat source 50, and also actively cool the food environment (such as the cooking pot). However, absent an active cooling system or fan to increase heat loss to the environment, the cooling rate will be a function of the difference between the ambient temperature and the actual temperature.

Following step 1028, the method 1000 may move to step 1032, where it is determined whether a new time interval for temperature measurement has been reached. The time interval for temperature measurement may be any amount of time. In some examples, the time interval is generally between 0.5 seconds to 2 seconds. Such a time interval may be sufficient in cooking applications to account for thermal lags that arise from the thermal mass of ingredients and the cooking device 18. In other examples, the time interval may be a time within a range of approximately 0.5 seconds (e.g., 0.5 seconds +/−0.2 seconds) and approximately 2 seconds, approximately 0.5 seconds and approximately 3 seconds, approximately 0.5 seconds and approximately 5 seconds, approximately 1 second and approximately 2 seconds, or any other range.

In some examples, the time interval may be based on the type of cooking device system 14, heat source system 46, and/or food item being used in the cooking process. For example, if the food item is easily overcooked, the time interval may be shorter so as to help prevent such overcooking. In such examples, profiles of possible cooking device systems 14, heat source systems 46, and/or food items may be included in the cooking instructions 70. These profiles may include indications of an appropriate time interval to use in the cooking process.

In some examples, the time interval may be fixed (e.g., it may be the same every time). In other examples, the time interval may vary. For example, the time interval may be longer when the time variant error, $\varepsilon(t)$, is far away from zero, and the time interval may decrease as the time variant error moves toward zero (or vice versa).

In some examples, while the cooking system 10 is waiting for the next time interval to be reached, the cooking system 10 may periodically update the heat loss term (S). An updated heat loss term is preferably determined 1 to 20 times per second, in some examples. In other examples, the heat loss term may be determined at the same time interval as the temperature measurements.

If it is determined that a new time interval for temperature measurement has not been reached, the method 1000 may continue to repeat step 1032 until the new time interval has been reached. While waiting to reach the new time interval, the heat source 50 may continue to provide an amount of energy based on the previously determined energy adjustment.

If it is determined that a new time interval for temperature measurement has been reached, the method 1000 may return to step 1008, where current measurement information 74 may be received by the heat source system 14 from the cooking device system 14. The steps of method 1000 may be performed any number of times for one or more steps (such as all heating steps) in a cooking process, and may also be performed any number of times for one or more stages in a particular step (e.g., where a stage may be the addition of a particular food item during a particular step in the cooking process). Once the cooking process is complete, the heat source system 46 may be shut down, and the method 1000 may end.

Modifications, additions, or omissions may be made to method 1000. For example, the steps of method 1000 may be performed in parallel or in any suitable order. As another example, the method 1000 of FIG. 2 may not determine a heat loss parameter. In such examples, the energy adjustment may be determined (at step 1024) without the heat loss parameter.

As a further example, instead of determining each of the proportional term, the integral term, the derivative term, and the heat loss term, in some examples, one or more (or all) of a default proportional term, a default integral term, a default derivative term, and/or a default heat loss term may be used instead. The default term(s) may be a term (e.g., an integral term) used in the prior step of a cooking process, a term used in a prior cooking process (such as the last time a similar steak was cooked), a term included in a cooking recipe (such as the cooking recipe currently being used to cook the food item), a term determined when other users performed a similar cooking process (such as an aggregate of terms calculated when other users cooked a similar steak), a term supplied by the manufacturer of the cooking device 18 and/or the heat source 50, a term received from a social media website or any other crowd sourcing site, any other default term, or any combination of the preceding. The default terms may be used at any time, such as when an actual term (e.g., an actual integral term) cannot be determined yet.

As a further example, although one or more of the steps of method 1000 are described above as being performed by the heat source system 46 (and/or the heat source 50), in some examples, one or more of these steps may be performed by any other device, including the cooking device system 14 and/or a remote device (e.g., a wireless device, such as a Smartphone). As an example of this, the cooking system 10 may include a wireless device (such as a Smartphone or tablet computer), another computing device (such as a web server), or a controller that is built into another cooking appliance (and that can control other devices). In such an example, the wireless device may receive the current measurement information 74 and the requested temperature information, and may utilize these pieces of information to perform one or more of the determinations discussed above (e.g., determining the energy adjustment, determining the time error variant, etc.). The results of such determinations may then be transmitted to the heat source system 46 and/or heat source 50, causing the heat source 50 to modify the amount of energy it is providing.

The remote device (or intermediary device) may be a separate device from the heat source 50. As such, the remote device may not include the heat source 50, and it may not be included in the same housing as the heat source 50. Instead, it may be a standalone device that is positioned remotely from heat source 50 and also positioned remotely from any device that includes the heat source 50. In other examples, the remote device may be integrated into the housing of the heat source system 46 and/or into the same housing as the heat source 50.

The method 1000 of FIG. 2 may preferably be used with a heat source system 46 and heat source 50 that is capable of continuous thermal output, in some examples. Such continuous thermal output may include the regulation of gas to a flame, or the electrical current supplied to a resistance heating element or a halogen lamp.

Alternatively, some heat source systems 46 and heat sources 50 may not provide continuous thermal output. These heat source systems 46 and heat sources 50 may, instead, provide non-continuous (e.g., discrete) thermal outputs. Examples of heat source systems 46 and/or heat sources 50 that provide discrete thermal outputs include induction burners and microwave ovens. Despite having discrete thermal outputs, these systems/devices may attempt to emulate a continuous thermal output using sequential duty cycles. Such duty cycles may include a pulse width modulation of energy, followed by an off period.

Typically, devices/systems that provide discrete thermal outputs may be constrained in operation by one or more of: (1) a minimum energy they can deliver, (2) a minimum pulse width (PW) or "on" cycle when powered, and/or (3) discrete energy levels. For example, typical induction burners may have only a fixed number of energy levels (e.g., 600 W, 800 W, 1000 W, and so forth at the end of an average power cycle, taking into account rise time during a pulse), and a minimum pulse width of about 1-2 seconds. When the minimum pulse width is larger than about 1-2 seconds, the energy adjustment provided by the induction burner will generally be constant during this period due to a rise time in energy. In some examples, the method 4000 of FIG. 5 may address one or more of these deficiencies associated with devices/systems that provide discrete thermal outputs.

Figure 5:
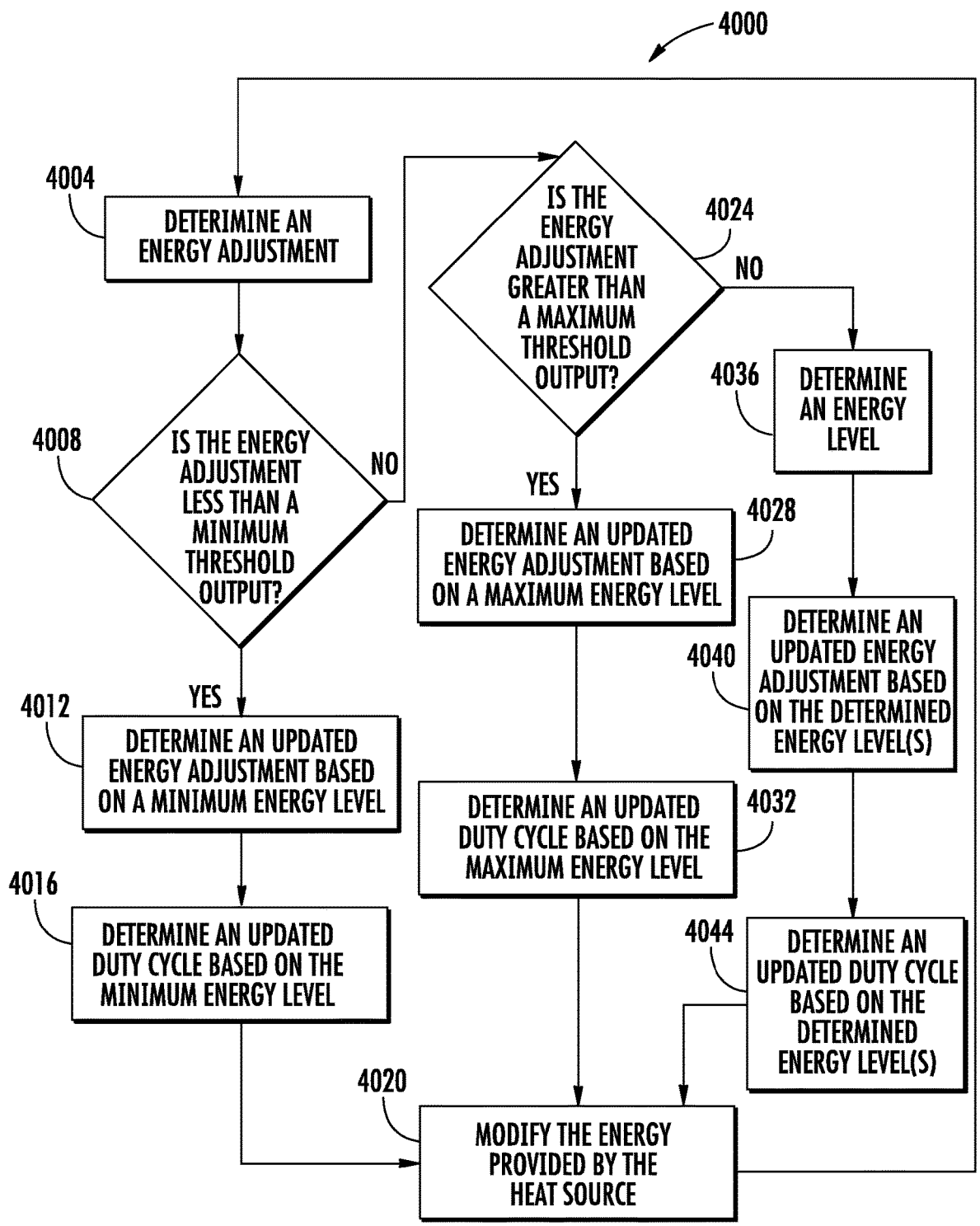
FIG. 5 illustrates an example method for modifying the energy provided by a heat source based on a determined energy adjustment.

FIG. 5 illustrates an example method for modifying the energy provided by a heat source based on a determined energy adjustment. The steps of method 4000 may be performed in conjunction with one or more of the steps of method 1000 of FIG. 2. For example, the steps of method 4000 may be performed as a substitute to step 1024 of method 1000, where the energy provided by heat source 50 is modified based on the energy adjustment. The steps of method 4000 may further be performed in response to any other determination of an energy adjustment. For example, the steps of method 4000 may be performed based on an energy adjustment provided manually by a user (such as a user setting an induction burner to provide a cooking temperature of 375° F.).

The method 4000 of FIG. 5 begins at step 4004, where an energy adjustment is determined. The energy adjustment can be determined in any manner. For example, the energy adjustment can be determined in the manner discussed above in step 1024 of FIG. 4. In such an example, the steps of method 4000 may be performed as a substitute to step 1024 of method 1000. As other examples, the energy adjustment can be determined based on an entry by a user (such as a user setting an induction burner to provide a cooking temperature of 375° F.), determined based on an entry provided by another device (such as the electronic cookbook/wireless device of U.S. Patent Application Publication No. 2017/0238749), determined in any other manner, or any combination of the preceding.

At step 4008, it is determined whether the energy adjustment is less than a minimum threshold output of the heat source 50. The minimum threshold output of the heat source 50 may refer to the minimum amount of energy that may be provided by the heat source 50 during a particular duty cycle. For example, an induction burner may be set at a particular duty cycle (e.g., a duty cycle that includes a 1 second minimum pulse width modulation of energy, followed by 1 second of being turned off), and at this setting, the lowest amount of energy the induction burner can provide may be 400 W. The minimum threshold output may be calculated as the minimum energy level of the heat source multiplied by the minimum pulse duration.

If the energy adjustment is greater than a minimum threshold output of the heat source 50 (e.g., if the energy adjustment is 700 W and the minimum threshold output of the heat source 50 is 400 W at the particular duty cycle), the method 4000 may move to step 4024, which is discussed in detail below. Otherwise, if the energy adjustment is less than a minimum threshold output of the heat source 50 (e.g., if the requested energy adjustment is 300 W and the minimum threshold output of the heat source 50 is 400 W at the particular duty cycle), the method 1000 may move to step 4012.

At step 4012, an updated energy adjustment for the heat source 50 may be determined based on the minimum energy level. In some examples, the updated energy adjustment for the heat source 50 may be determined to be the minimum energy level of the heat source 50. As is discussed above, the heat source 50 may have a fixed number of energy levels (e.g., 600 W, 800 W, 1000 W). In such a case, the lowest energy level (e.g., 600 W in this case) may be determined to be the updated energy adjustment. Such an updated energy adjustment may cause the heat source 50 to provide energy at its lowest energy level (e.g., 600 W in this case).

At step 4016, an updated duty cycle for the heat source 50 may be determined based on the minimum energy level. As is discussed above, the duty cycle includes a pulse width modulation of energy, followed by an off period (time off period) that averages out the energy provided during the duty cycle. The new duty cycle may be calculated in any manner so as to provide (or attempt to provide) the desired energy adjustment (e.g., 300 W). As one example, a new time off interval may be calculated. In such an example, the new time off interval may be calculated to be a time interval that is sufficient to provide for an average energy that is equal to the requested energy adjustment. As an example of this, the calculation may provide for a longer time off interval, which will decrease the average energy provided by the heat source 50 during the duty cycle. In some examples, by increasing the time off interval in the duty cycle, the heat source 50 may be able to provide the requested energy adjustment. For example, by increasing the time off interval in the duty cycle, the heat source 50 may be able to provide the requested 300 W using the minimum power level of 400 W at the 1 second minimum pulse width.

The method 4000 then moves to step 4020, where the energy provided by heat source 50 is modified based on the updated energy adjustment and the updated duty cycle. For example, if the updated energy adjustment indicates that energy should be decreased, and the duty cycle indicates that the time off interval (of the duty cycle) should be increased, the heat source 50 (based on a signal from the processor 58, for example) may decrease the amount of energy provided by the heat source 50, and may further decrease the time off interval of the duty cycle.

In some examples, this may allow the heat source 50 to provide the originally determined energy adjustment (i.e., the requested energy adjustment that is determined at step 4004), even though it was less than a minimum threshold output of the heat source 50. Furthermore, in some examples, it may also allow the heat source 50 to provide the originally determined energy adjustment, even though the heat source 50 provides discrete thermal outputs.

The step 4020 of method 4000 may replace the step 1028 of method 1000 of FIG. 2, in some examples. In such an example, after the energy provided by heat source 50 is modified based on the energy adjustment and the duty cycle (in accordance with step 4016), the method may move to step 1032 of FIG. 2, where it is determined whether a new time interval for temperature measurement has been reached. Details regarding this step are discussed above with regard to FIG. 2. If it is determined that a new time interval for temperature measurement has been reached, the method may return to step 1008 of FIG. 2, where current measurement information 74 may be received by the heat source system 46 from the cooking device system 14. This may cause the steps of FIG. 2 and FIG. 4 to be repeated for the new measurements and determinations, as is discussed above.

Alternatively, the step 4020 of method 4000 (and/or the other steps of method 4000) may not be performed in conjunction with FIG. 2. In such examples, the heat source 50 may continue to provide the modified energy until a new energy adjustment is determined (step 4004). For example, the heat source 50 may continue to provide the modified energy until a new energy adjustment is manually entered by a user (e.g., a user setting an induction burner to provide a new cooking temperature of 450° F.). This may cause the method 4000 to be repeated with the new energy adjustment.

Steps 4012-4020 of FIG. 4 are discussed above with regard to a determination at step 4008 that the energy adjustment is less than the minimum threshold output of the heat source 50. Alternatively, at step 4008, if it is determined that the energy adjustment is greater than a minimum threshold output of the heat source 50 (e.g., if the energy adjustment is 700 W and the minimum threshold output of the heat source 50 is 400 W at the particular duty cycle), the method 4000 may instead move to step 4024 (as opposed to step 4012).

At step 4024, it is determined whether the energy adjustment is greater than a maximum threshold output of the heat source 50. The maximum threshold output of the heat source 50 may refer to the maximum amount of energy that may be provided by the heat source 50 during a particular duty cycle. For example, an induction burner may be set at a particular duty cycle (e.g., a duty cycle that includes a 1 second minimum pulse width modulation of energy, followed by 1 second of being turned off), and at this setting, the highest amount of energy the induction burner can provide may be 900 W. The maximum threshold output may be calculated as the maximum energy level of the heat source multiplied by the minimum pulse width duration (or the current pulse width duration).

If the energy adjustment is less than a maximum threshold output of the heat source 50 (e.g., if the requested energy adjustment is 750 W and the maximum threshold output of the heat source 50 is 900 W at the particular duty cycle), the method 4000 may move to step 4036, which is discussed in detail below. Otherwise, if the energy adjustment is greater than a maximum threshold output of the heat source 50 (e.g., if the requested energy adjustment is 950 W and the maximum threshold output of the heat source 50 is 900 W at the particular duty cycle), the method 1000 may move to step 4028.

At step 4028, an updated energy adjustment for the heat source 50 may be determined based on the maximum energy level. In some examples, the updated energy adjustment for the heat source 50 may be determined to be the maximum energy level of the heat source 50. For example, the heat source 50 may have a fixed number of energy levels (e.g., 600 W, 800 W, 1000 W). In such a case, the highest energy level (e.g., 1000 W in this case) may be determined to be the updated energy adjustment. Such an updated energy adjustment may cause the heat source 50 to provide energy at its highest energy level (e.g., 1000 W in this case).

At step 4032, an updated duty cycle for the heat source 50 may be determined based on the maximum energy level. As is discussed above, the duty cycle includes a pulse width modulation of energy, followed by an off period (time off period) that averages out the energy provided during the duty cycle. The new duty cycle may be calculated in any manner so as to provide (or attempt to provide) the desired energy adjustment (e.g., 950 W).

As one example, a new time off interval may be calculated. In such an example, the new time off interval may be calculated to be a time interval that is sufficient to provide for an average energy that is equal to the desired energy adjustment. As an example of this, the calculation may provide for a shorter time off interval, which will increase the average energy provided by the heat source 50 during the duty cycle. In some examples, by decreasing the time off interval in the duty cycle, the heat source 50 may be able to provide the desired energy adjustment. For example, by decreasing the time off interval in the duty cycle, the heat source 50 may be able to provide the requested 950 W using the maximum power level of 1000 W at the 1 second minimum pulse width.

As another example, a new pulse width may be calculated. In such an example, the new pulse width may be calculated to be a pulse width that is sufficient to provide for an average energy that is equal to the desired energy adjustment. As an example of this, the calculation may provide for a longer pulse width, which will increase the average energy provided by the heat source 50 during the duty cycle. In some examples, by increasing the pulse width in the duty cycle, the heat source 50 may be able to provide the desired energy adjustment. For example, by increasing the pulse width in the duty cycle, the heat source 50 may be able to provide the requested 950 W using the maximum power level of 1000 W at the new pulse width. It should be understood that while any energy adjustment (or most energy adjustments) can be accommodated by extending the pulse width, it may not be desirable to extend the time interval between successive temperature measurements (see step 1028 of FIG. 2) beyond a predetermined portion of the duty cycle. Hence, it may be desirable to utilize pulse widths about or less than this value.

As a further example, both a new pulse width and a new time off interval may be calculated. This combination of the new pulse width (e.g., a longer pulse width) and the new time off (e.g., a shorter time off) may allow the heat source 50 to provide the desired energy adjustment.

The method 4000 then moves to step 4020, where the energy provided by heat source 50 is modified based on the updated energy adjustment and the updated duty cycle, as is discussed above. For example, if the updated energy adjustment indicates that energy should be increased, and the duty cycle indicates that the time off interval (of the duty cycle) should be decreased (and/or that the pulse width should be increased), the heat source 50 (based on a signal from the processor 58, for example) may increase the amount of energy provided by the heat source 50, and may further decrease the time off interval (and/or increase the pulse width) of the duty cycle.

In some examples, this may allow the heat source 50 to provide the originally determined energy adjustment (i.e., the requested energy adjustment that is determined at step 4004), even though it was greater than a maximum threshold output of the heat source 50. Furthermore, in some examples, it may also allow the heat source 50 to provide the originally determined energy adjustment, even though the heat source 50 provides discrete thermal outputs.

Steps 4028-4032 of FIG. 4 are discussed above with regard to a determination at step 4024 that the energy adjustment is greater than the maximum threshold output of the heat source 50. Alternatively, at step 4024, if it is determined that the energy adjustment is less than a maximum threshold output of the heat source 50 (e.g., if the energy adjustment is 750 W and the maximum threshold output of the heat source 50 is 900 W at the particular duty cycle), the method 4000 may instead move to step 4036 (as opposed to step 4028).

At step 4036, an energy level may be determined based on the requested energy adjustment. The determined energy level may be the energy level that is closest to the requested energy adjustment (assuming, for example, that the desired pulse width of the duty cycle is a given or predetermined value that is greater than the minimum pulse duration). For example, as is discussed above, the heat source 50 may have a fixed number of energy levels (e.g., 600 W, 800 W, 1000 W). In such a case, if the requested energy adjustment is 750 W, the 800 W power level may be determined to be the closest. Thus, the 800 W energy level may be determined at step 4036.

The closest energy level may be an energy level that is larger than the requested energy adjustment (e.g., 800 W is larger than 750 W), or it may be an energy level that is smaller than the requested energy adjustment (e.g., 700 W is smaller than 750 W). Thus, the closest energy level may be rounded up (or down) from the requested energy adjustment. In some examples, only a larger energy level may be determined to be the closest energy level.

In some examples, it may be desirable to determine more than one energy level at step 4036. For example, when the requested energy adjustment falls between to discrete values, it may be desirable to have a duty cycle or average power cycle where an average power level is produced between two power levels. For example, in order to produce an average power of 700 W, it may be desirable to power the heat source 50 at a 600 W power level for 2 seconds, and then power the heat source 50 at a 800 W power level for 2 seconds. Then, the time period to measure the temperature and calculate the deviation in temperature can be at the end of these four seconds.

At step 4040, an updated energy adjustment (or adjustments) for the heat source 50 may be determined based on the determined energy level. In some examples, the updated energy adjustment for the heat source 50 may be determined to be the energy level(s) determined in step 4036.

At step 4044, an updated duty cycle for the heat source 50 may be determined based on the energy levels. For example, the duty cycle includes a pulse width modulation of energy, followed by an off period (time off period) that averages out the energy provided during the duty cycle. The new duty cycle may be calculated in any manner so as to provide (or attempt to provide) the requested energy adjustment (e.g., 750 W).

As one example, a new time off interval may be calculated. In such an example, the new time off interval may be calculated to be a time interval that is sufficient to provide for an average energy that is equal to the desired energy adjustment. As an example of this, the calculation may provide for a shorter time off interval, which will increase the average energy provided by the heat source 50 during the duty cycle. In some examples, by decreasing the time off interval in the duty cycle, the heat source 50 may be able to provide the desired energy adjustment. For example, by decreasing the time off interval in the duty cycle, the heat source 50 may be able to provide the requested 750 W using the power level of 800 W at a predetermined pulse width.

As another example, a new pulse width may be calculated. In such an example, the new pulse width may be calculated to be a pulse width that is sufficient to provide for an average energy that is equal to the desired energy adjustment. As an example of this, the calculation may provide for a longer pulse width, which will increase the average energy provided by the heat source 50 during the duty cycle. In some examples, by increasing the pulse width in the duty cycle, the heat source 50 may be able to provide the desired energy adjustment. For example, by increasing the pulse width in the duty cycle, the heat source 50 may be able to provide the requested 750 W using the maximum power level of 800 W at the new pulse width.

As a further example, both a new pulse width and a new time off interval may be calculated. This combination of the new pulse width (e.g., a longer pulse width) and the new time off (e.g., a shorter time off) may allow the heat source 50 to provide the requested energy adjustment.

As another example, when two energy adjustments are being used (e.g., a first pulse of 800 W followed by a pulse of 600 W) to provide for the requested energy adjustment (e.g., 750 W), a new pulse width and/or a new time off interval may be calculated for each of the energy adjustments (e.g., for both the 800 W and the 600 W pulses). For example, if the requested energy adjustment is 623 W, the duty cycle may be updated so that the heat source 50 first applies 800 W for 2 seconds, and then applies 600 W for a much longer pulse width to reach an average of 623 W. As another example, if the requested energy adjustment is 605 W, the duty cycle may be updated even further so that the heat source 50 applies the 600 W for an even longer pulse width than it would have for the 623 W request. In some examples, it may be preferable to round the energy adjustment value up or down in increments of no more than ¼ the difference between power levels. This may, in some examples, help to avoid a pulse width of more than 4×2 second (8 seconds), plus the additional 2 seconds.

The method 4000 then moves to step 4020, where the energy provided by heat source 50 is modified based on the updated energy adjustment and the updated duty cycle, as is discussed above. For example, if the updated energy adjustment indicates that energy should be increased for a first part of the duty cycle (e.g., a first pulse width) and also indicates that the energy should be decreased for a second part of the duty cycle (e.g., a second pulse width), the heat source 50 (based on a signal from the processor 58, for example) may increase the energy (e.g., 800 W) for the first part of the duty cycle, and then decrease the energy (e.g., 600 W) for the second part of the duty cycle. In some examples, this may result in a blend of the heat source 50 being powered at a higher power (e.g., 800 W) for a first pulse having a first duration, then being powered at a lower power (e.g, 600 W) for a second pulse having a second duration, and then optionally being turned off for a third duration. Furthermore, it may be convenient to measure temperature at each interval before the power is optionally changed.

In some examples, this may allow the heat source 50 to provide the originally determined energy adjustment (i.e., the requested energy adjustment that is determined at step 4004), even though it was less than a maximum threshold output of the heat source 50. Furthermore, in some examples, it may also allow the heat source 50 to provide the originally requested energy adjustment, even though the heat source 50 provides discrete thermal outputs.

Modifications, additions, or omissions may be made to method 4000. For example, the steps of method 4000 may be performed in parallel or in any suitable order.

This specification has been written with reference to various non-limiting and non-exhaustive embodiments or examples. However, it will be recognized by persons having ordinary skill in the art that various substitutions, modifications, or combinations of any of the disclosed embodiments or examples (or portions thereof) may be made within the scope of this specification. Thus, it is contemplated and understood that this specification supports additional embodiments or examples not expressly set forth in this specification. Such embodiments or examples may be obtained, for example, by combining, modifying, or reorganizing any of the disclosed steps, components, elements, features, aspects, characteristics, limitations, and the like, of the various non-limiting and non-exhaustive embodiments or examples described in this specification. In this manner, Applicant reserves the right to amend the claims during prosecution to add features as variously described in this specification.

What is claimed is:

1. A method, comprising:
    a) providing, by a heat source of a heat source system, an amount of energy to be used to cook a food item in accordance with a cooking recipe;
    b) receiving, by one or more processors communicatively coupled to the heat source and further communicatively coupled to one or more temperature sensors, an indication of measured temperature associated with the food item;
    c) receiving, by the processors, an indication of a requested cooking temperature;
    d) determining, by the processors, whether the requested cooking temperature is less than the measured temperature;
    e) in response to the determination that the requested cooking temperature is less than measured temperature, determining, by the processors, a proportional term based on a difference between the requested cooking temperature and the measured temperature;
    f) energizing the heat source in response to the determined proportional term;
    g) receiving, by the processors, a plurality of indications of additional measured temperature associated with the food item at different times;
    h) determining, by the processors, an integral term based on differences between the requested cooking temperature and the additional measured temperatures;

i) determining, by the processors, a heat loss term based on the integral term;
j) determining, by the processors, an energy adjustment based on the proportional term, the integral term, and the heat loss term; and
k) energizing the heat source in accordance with the determined energy adjustment.

2. The method of claim 1, wherein the heat loss term is calculated as a fraction of the integral term.

3. The method of claim 1, wherein the heat loss term is calculated as a fraction of the integral term by multiplying the integral term by a number between 0.5 to 0.9.

4. The method of claim 1, wherein the heat loss term is calculated from an integral term calculated over a plurality of the additional measured temperatures that extend from the last two consecutive instances in which the additional measured temperature was less than the requested cooking temperature.

5. The method of claim 1, further comprising:
a) receiving, by the processors, an indication of another measured temperature associated with the food item;
b) determining, by the processors, whether the requested cooking temperature is less than the another measured temperature;
c) in response to the determination that the requested cooking temperature is less than the another measured temperature, determining, by the processors:
   i) a second proportional term based on a difference between the requested cooking temperature and the another measured temperature; and
   ii) a first derivative term based on the past change in the measured temperatures;
d) energizing the heat source in response to the determined second proportional term and the first derivative term.

6. A method, comprising:
a) providing, by a heat source of a heat source system, an amount of energy to be used to cook a food item;
b) receiving, by one or more processors communicatively coupled to the heat source and further communicatively coupled to one or more temperature sensors, an indication of a requested cooking temperature;
c) receiving, by the processors, a plurality of indications of measured temperature associated with the food item at different times;
d) determining, by the processors, an integral term based on differences between the requested cooking temperature and the measured temperatures;
e) determining, by the processors, a heat loss term based on the integral term;
f) determining, by the processors, an energy adjustment based on the heat loss term; and
g) modifying, by the heat source, the amount of energy provided by the heat source in accordance with the determined energy adjustment.

7. The method of claim 6, further comprising determining, by the processors, the energy adjustment based on the heat loss term and the integral term.

8. The method of claim 6, wherein the heat loss term is calculated as a fraction of the integral term.

9. The method of claim 6, wherein the heat loss term is calculated as a fraction of the integral term by multiplying the integral term by a number between 0.5 to 0.9.

10. The method of claim 6, wherein the heat loss term is calculated from an integral term calculated over a plurality of the measured temperatures that extend from the last two consecutive instances in which the measured temperature was less than the requested cooking temperature.

11. The method of claim 6, wherein the heat loss term is calculated from a plurality of integral terms, each of the plurality of integral terms being calculated over a plurality of the measured temperatures that extend from the last two consecutive instances in which the measured temperature was less than the requested cooking temperature.

12. The method of claim 6, wherein the heat loss term is calculated from an average of a plurality of integral terms, each of the plurality of integral terms being calculated over a plurality of the measured temperatures that extend from the last two consecutive instances in which the measured temperature was less than the requested cooking temperature.

13. The method of claim 12, wherein the heat loss term is further calculated as a fraction of each of the plurality of integral terms by multiplying each of the plurality of integral terms by a number between 0.5 to 0.9.

14. The method of claim 6, wherein the heat loss term is calculated from a weighted average of a plurality of integral terms, each of the plurality of integral terms being calculated over a plurality of the measured temperatures that extend from the last two consecutive instances in which the measured temperature was less than the requested cooking temperature, wherein the most recently determined of the plurality of integral terms is weighted more than a previously determined integral term.

15. The method of claim 14, wherein the heat loss term is further calculated as a fraction of each of the plurality of integral terms by multiplying each of the plurality of integral terms by a number between 0.5 to 0.9.

16. The method of claim 6, further comprising:
a) determining, by the processors, a proportional term based on the differences between the requested cooking temperature and the measured temperatures;
b) determining, by the processors, a derivative term based on the differences between the requested cooking temperature and the measured temperatures; and
c) determining, by the processors, the energy adjustment based on the heat loss term, the integral term, the proportional term, and the derivative term.

* * * * *